United States Patent
Lim et al.

(10) Patent No.: US 12,289,780 B2
(45) Date of Patent: Apr. 29, 2025

(54) METHOD FOR APPLYING MSD AND APPARATUS THEREOF

(71) Applicant: LG Electronics Inc., Seoul (KR)

(72) Inventors: Suhwan Lim, Seoul (KR); Yoonoh Yang, Seoul (KR); Sangwook Lee, Seoul (KR); Jaehyuk Jang, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 17/709,919

(22) Filed: Mar. 31, 2022

(65) Prior Publication Data

US 2022/0322474 A1  Oct. 6, 2022

(30) Foreign Application Priority Data

Apr. 1, 2021 (KR) .......................... 10-2021-0042448
Oct. 21, 2021 (KR) .......................... 10-2021-0141184

(51) Int. Cl.
*H04W 76/15* (2018.01)
*H04L 5/00* (2006.01)
*H04W 24/10* (2009.01)

(52) U.S. Cl.
CPC ........... *H04W 76/15* (2018.02); *H04L 5/0092* (2013.01); *H04W 24/10* (2013.01)

(58) Field of Classification Search
CPC . H04W 76/15; H04W 24/10; H04W 72/0453; H04W 76/16; H04L 5/0092; H04L 5/0007; Y02D 30/70; H04B 1/005; H04B 1/525
See application file for complete search history.

(56) References Cited

U.S. PATENT DOCUMENTS 11,785,659 B2 * 10/2023 Lim ..................... H04B 1/525
                                                370/329
2019/0158137 A1 * 5/2019 Brunel ..................... H04B 1/04
(Continued)

FOREIGN PATENT DOCUMENTS

JP    2020-501385 A    1/2020
WO    2020197129 A1    10/2020
WO    2020201617 A1    10/2020

OTHER PUBLICATIONS

LG Electronics, "MSD results for new DC LTE x brands (xDL/1UL, x=1,2,3,4) + NR 2 bands (2DL/1UL) band combinations in Rel-17", 3GPP TSG RAN WG4 Meeting #98-e, Jan. 25-Feb. 5, 2021, R4-2100279.

(Continued)

*Primary Examiner* — Will W Lin
(74) *Attorney, Agent, or Firm* — BRYAN CAVE LEIGHTON PAISNER LLP

(57) ABSTRACT

A disclosure of this specification provides a device configured to operate in a wireless system, the device comprising: a transceiver configured with an Evolved Universal Terrestrial Radio Access (E-UTRA)—New Radio (NR) Dual Connectivity (EN-DC), wherein the EN-DC is configured to use three bands, a processor operably connectable to the transceiver, wherein the processer is configured to: control the transceiver to receive a downlink signal, control the transceiver to transmit an uplink signal via at least two bands among the three bands, wherein a value of Maximum Sensitivity Degradation (MSD) is applied to a reference sensitivity for receiving the downlink signal.

12 Claims, 16 Drawing Sheets

(56) References Cited

U.S. PATENT DOCUMENTS

| | | | | |
|---|---|---|---|---|
| 2019/0230663 A1* | 7/2019 | Lim | ................... | H04W 72/0453 |
| 2020/0313812 A1 | 10/2020 | Park et al. | | |
| 2021/0029698 A1 | 1/2021 | Lim et al. | | |
| 2022/0151003 A1* | 5/2022 | Lim | ..................... | H04L 5/001 |
| 2022/0231821 A1* | 7/2022 | Lim | .................... | H04B 17/345 |
| 2022/0369405 A1* | 11/2022 | Lim | .................... | H04B 17/336 |
| 2023/0155625 A1* | 5/2023 | Lim | ..................... | H04B 17/14 |
| | | | | 455/78 |

OTHER PUBLICATIONS

MediaTek Inc., "MSD evaluation for TR 37.717-11-21", 3GPP TSG-RAN WG4 Meeting #98-e, Jan. 25-Feb. 5, 2021, R4-2100706.

Softbank Corp., "TP for TR 37.717-11-21: EN-DC_8_n28-n79", 3GPP TSG RAN WG4 Meeting #100-e, R4-2114838, Online, Aug. 16-27, 2021.

3rd Generation Partnership Project; Technical Specification Group Radio Access Network; NR inter-band Carrier Aggregation/Dual connectivity for 2 bands DL with x bands UL (x=1,2) Releases 16, 3GPP TR 38.716-02-00, 267 pages, Apr. 2020.

3rd Generation Partnership Project; Technical Specification Group Radio Access Neteworks; Dual Connectivity (DC) of x bands (x=1, 2, 3, 4) LTE inter-band CA (x DL/1 Ul) and 2 bands NR Inter-band CA (2 DL/1 Ul) band combinations (Release 17), 3GPP TR 37.717-11-21, 94 pages, Sep. 2020.

* cited by examiner

METHOD FOR APPLYING MSD AND APPARATUS THEREOF

CROSS-REFERENCE TO RELATED APPLICATIONS

Pursuant to 35 U.S.C. § 119 (a), this application claims the benefit of Korean Patent Applications No. 10-2021-0042448 filed on Apr. 1, 2021, and No. 10-2021-0141184 filed on Oct. 21, 2021, the contents of which are all hereby incorporated by reference herein in their entirety.

BACKGROUND OF THE DISCLOSURE

Field of the Disclosure

The present disclosure relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A mobile device should be configured to satisfy a reference sensitivity power level (REFSENS) which is the minimum average power for each antenna port of the mobile device when receiving the downlink signal.

When a harmonics component and/or an intermodulation distortion (IMD) component occurs, there is a possibility that the REFSENS for the downlink signal may not be satisfied due to the uplink signal transmitted by the mobile device.

SUMMARY OF THE DISCLOSURE

In accordance with an embodiment of the present disclosure, a disclosure of this specification provides a device configured to operate in a wireless system, the device comprising: a transceiver configured with an Evolved Universal Terrestrial Radio Access (E-UTRA)-New Radio (NR) Dual Connectivity (EN-DC), wherein the EN-DC is configured to use three bands, a processor operably connectable to the transceiver, wherein the processer is configured to: control the transceiver to receive a downlink signal, control the transceiver to transmit an uplink signal via at least two bands among the three bands, wherein a value of Maximum Sensitivity Degradation (MSD) is applied to a reference sensitivity for receiving the downlink signal, wherein the value of the MSD is pre-configured for a first combination of bands 30, n5 and n77, a second combination of band 8, n28 and n79, a third combination of bands 7, n12 and n77, a fourth combination of bands 7, n71 and n77, a fifth combination of bands 5, n2 and n41, a sixth combination of bands 3, n28 and n75.

The present disclosure can have various advantageous effects.

For example, by performing disclosure of this specification, UE can transmit signal with dual uplink by applying MSD value.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
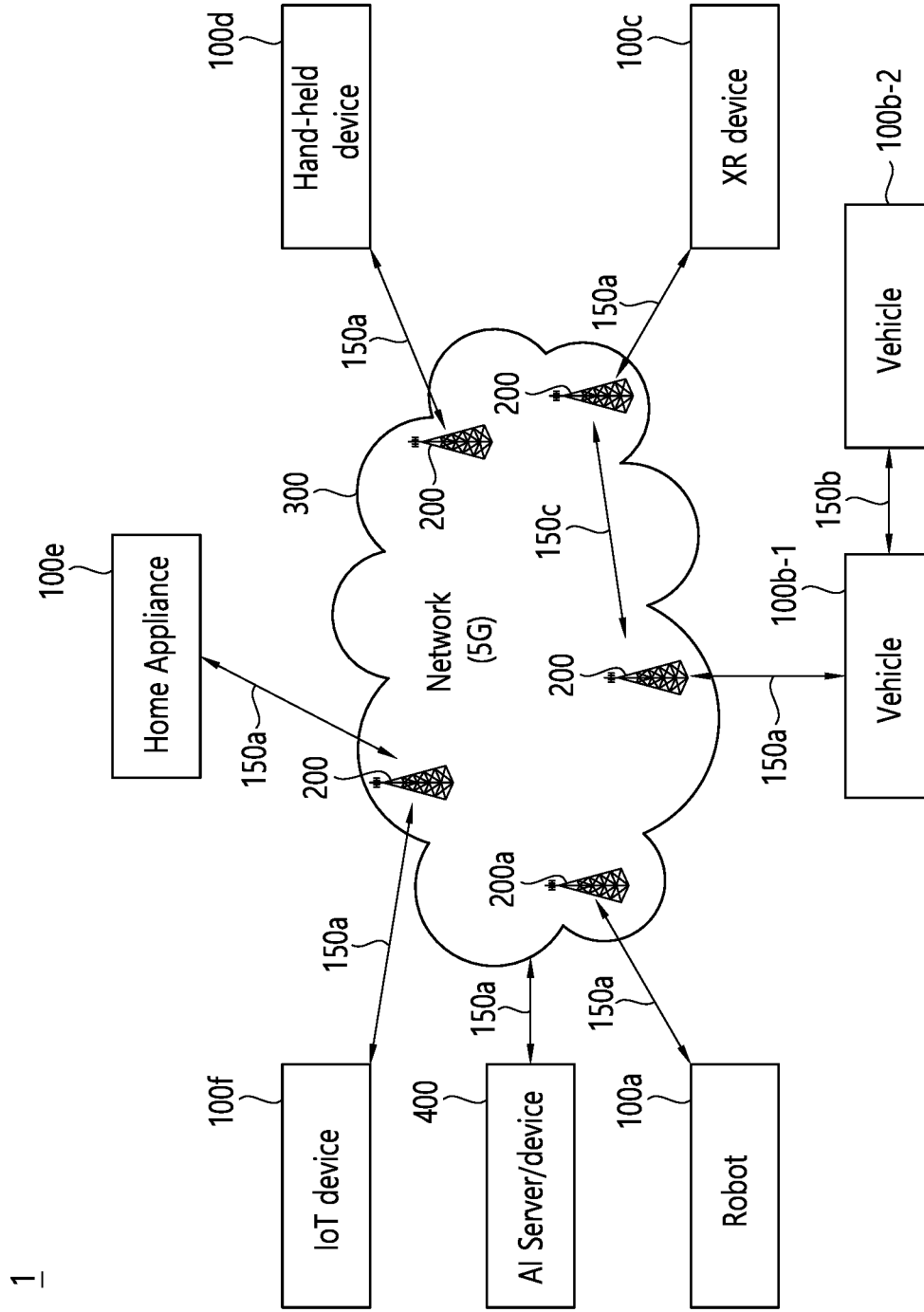
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
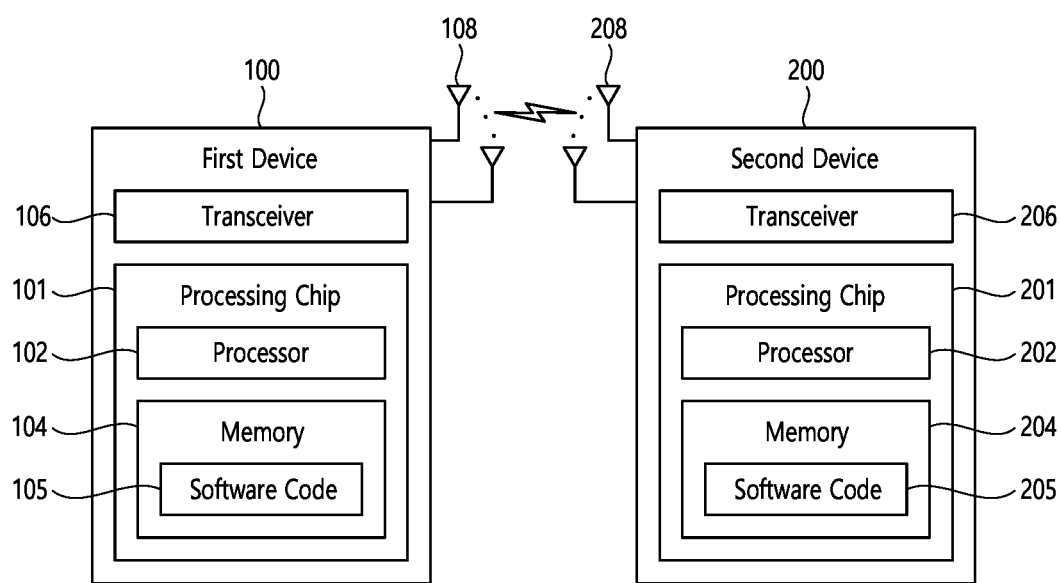
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. [69] The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
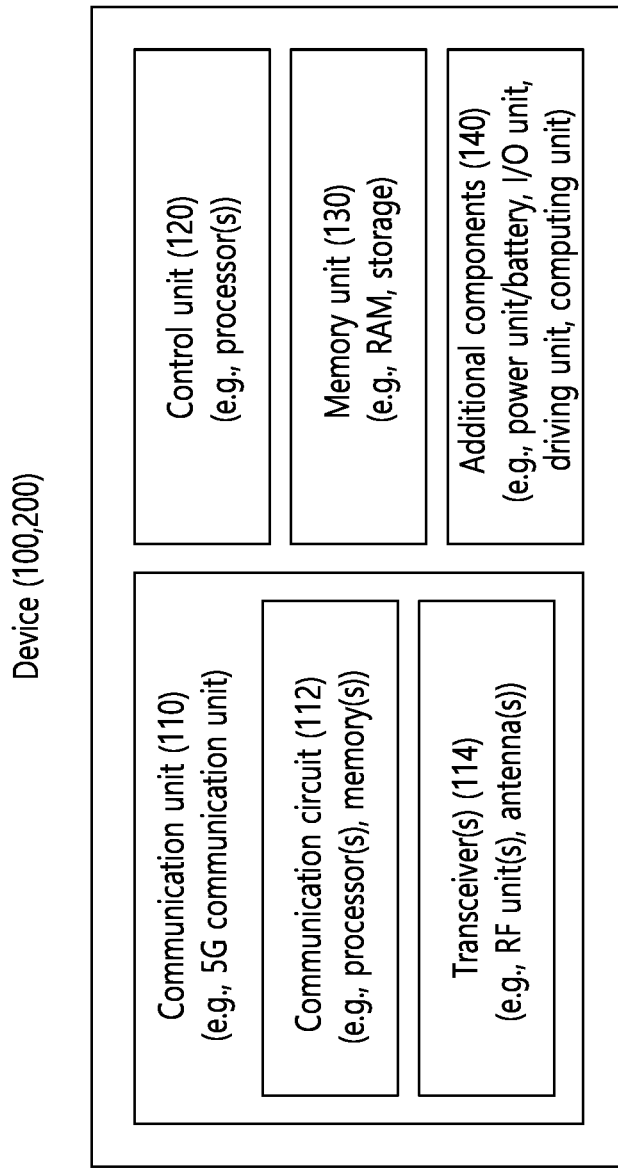
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
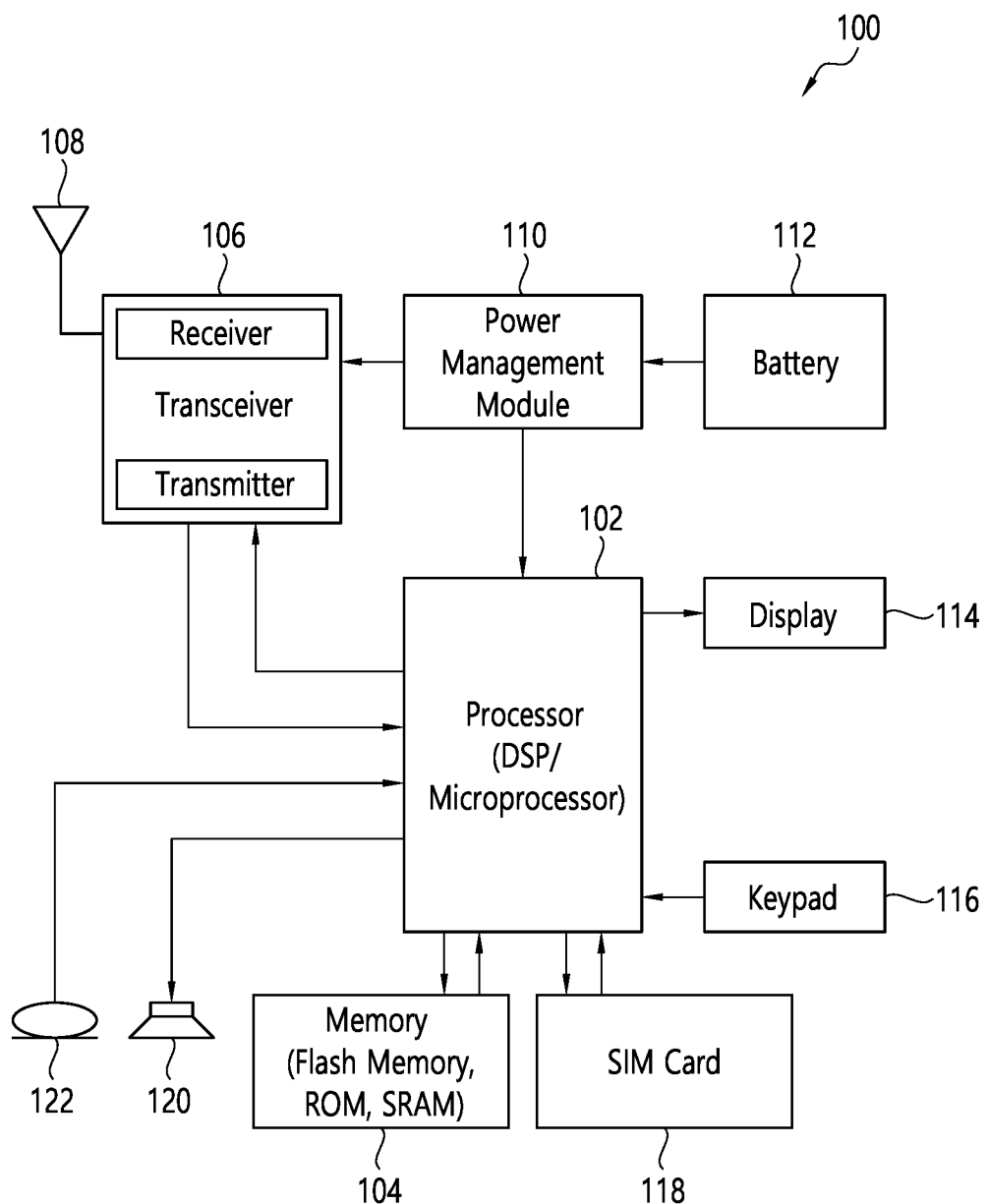
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

<Operating Band>

The LTE/LTE-A based cell operates in an Evolved Universal Terrestrial Radio Access (E-UTRA) operating band. And, the NR-based cell operates in a NR band. Here, the DC may be called as EN-DC.

The Table 3 is an example of E-UTRA operating bands.

TABLE 3

| E-UTRA Operating Band | Uplink (UL) operating band BS receive UE transmit $F_{UL\_low}$-$F_{UL\_high}$ | | | Downlink (DL) operating band BS transmit UE receive $F_{DL\_low}$-$F_{DL\_high}$ | | | Duplex Mode |
|---|---|---|---|---|---|---|---|
| 1 | 1920 MHz | — | 1980 MHz | 2110 MHz | — | 2170 MHz | FDD |
| 2 | 1850 MHz | — | 1910 MHz | 1930 MHz | — | 1990 MHz | FDD |
| 3 | 1710 MHz | — | 1785 MHz | 1805 MHz | — | 1880 MHz | FDD |
| 4 | 1710 MHz | — | 1755 MHz | 2110 MHz | — | 2155 MHz | FDD |
| 5 | 824 MHz | — | 849 MHz | 869 MHz | — | 894 MHz | FDD |
| 6 | 830 MHz | — | 840 MHz | 875 MHz | — | 885 MHz | FDD |
| 7 | 2500 MHz | — | 2570 MHz | 2620 MHz | — | 2690 MHz | FDD |
| 8 | 880 MHz | — | 915 MHz | 925 MHz | — | 960 MHz | FDD |
| 9 | 1749.9 MHz | — | 1784.9 MHz | 1844.9 MHz | — | 1879.9 MHz | FDD |
| 10 | 1710 MHz | — | 1770 MHz | 2110 MHz | — | 2170 MHz | FDD |
| 11 | 1427.9 MHz | — | 1447.9 MHz | 1475.9 MHz | — | 1495.9 MHz | FDD |
| 12 | 699 MHz | — | 716 MHz | 729 MHz | — | 746 MHz | FDD |
| 13 | 777 MHz | — | 787 MHz | 746 MHz | — | 756 MHz | FDD |
| 14 | 788 MHz | — | 798 MHz | 758 MHz | — | 768 MHz | FDD |
| 15 | Reserved | | | Reserved | | | FDD |
| 16 | Reserved | | | Reserved | | | FDD |
| 17 | 704 MHz | — | 716 MHz | 734 MHz | — | 746 MHz | FDD |
| 18 | 815 MHz | — | 830 MHz | 860 MHz | — | 875 MHz | FDD |
| 19 | 830 MHz | — | 845 MHz | 875 MHz | — | 890 MHz | FDD |
| 20 | 832 MHz | — | 862 MHz | 791 MHz | — | 821 MHz | FDD |
| 21 | 1447.9 MHz | — | 1462.9 MHz | 1495.9 MHz | — | 1510.9 MHz | FDD |
| 22 | 3410 MHz | — | 3490 MHz | 3510 MHz | — | 3590 MHz | FDD |
| 23 | 2000 MHz | — | 2020 MHz | 2180 MHz | — | 2200 MHz | FDD |
| 24 | 1626.5 MHz | — | 1660.5 MHz | 1525 MHz | — | 1559 MHz | FDD |
| 25 | 1850 MHz | — | 1915 MHz | 1930 MHz | — | 1995 MHz | FDD |
| 26 | 814 MHz | — | 849 MHz | 859 MHz | — | 894 MHz | FDD |
| 27 | 807 MHz | — | 824 MHz | 852 MHz | — | 869 MHz | FDD |
| 28 | 703 MHz | — | 748 MHz | 758 MHz | — | 803 MHz | FDD |
| 29 | N/A | | | 717 MHz | — | 728 MHz | FDD2 |
| 30 | 2305 MHz | — | 2315 MHz | 2350 MHz | — | 2360 MHz | FDD |
| 31 | 452.5 MHz | — | 457.5 MHz | 462.5 MHz | — | 467.5 MHz | FDD |
| 32 | N/A | | | 1452 MHz | — | 1496 MHz | FDD2 |
| 33 | 1900 MHz | — | 1920 MHz | 1900 MHz | — | 1920 MHz | TDD |
| 34 | 2010 MHz | — | 2025 MHz | 2010 MHz | — | 2025 MHz | TDD |
| 35 | 1850 MHz | — | 1910 MHz | 1850 MHz | — | 1910 MHz | TDD |
| 36 | 1930 MHz | — | 1990 MHz | 1930 MHz | — | 1990 MHz | TDD |
| 37 | 1910 MHz | — | 1930 MHz | 1910 MHz | — | 1930 MHz | TDD |
| 38 | 2570 MHz | — | 2620 MHz | 2570 MHz | — | 2620 MHz | TDD |
| 39 | 1880 MHz | — | 1920 MHz | 1880 MHz | — | 1920 MHz | TDD |
| 40 | 2300 MHz | — | 2400 MHz | 2300 MHz | — | 2400 MHz | TDD |
| 41 | 2496 MHz | — | 2690 MHz | 2496 MHz | — | 2690 MHz | TDD |
| 42 | 3400 MHz | — | 3600 MHz | 3400 MHz | — | 3600 MHz | TDD |
| 43 | 3600 MHz | — | 3800 MHz | 3600 MHz | — | 3800 MHz | TDD |
| 44 | 703 MHz | — | 803 MHz | 703 MHz | — | 803 MHz | TDD |
| 45 | 1447 MHz | — | 1467 MHz | 1447 MHz | — | 1467 MHz | TDD |
| 46 | 5150 MHz | — | 5925 MHz | 5150 MHz | — | 5925 MHz | TDD8 |
| 47 | 5855 MHz | — | 5925 MHz | 5855 MHz | — | 5925 MHz | TDD11 |
| 48 | 3550 MHz | — | 3700 MHz | 3550 MHz | — | 3700 MHz | TDD |
| 49 | 3550 MHz | — | 3700 MHz | 3550 MHz | — | 3700 MHz | TDD16 |
| 50 | 1432 MHz | — | 1517 MHz | 1432 MHz | — | 1517 MHz | TDD13 |
| 51 | 1427 MHz | — | 1432 MHz | 1427 MHz | — | 1432 MHz | TDD13 |
| 52 | 3300 MHz | — | 3400 MHz | 3300 MHz | — | 3400 MHz | TDD |
| 53 | 2483.5 MHz | — | 2495 MHz | 2483.5 MHz | — | 2495 MHz | TDD |
| ... | | | | | | | |
| 64 | | | | Reserved | | | |
| 65 | 1920 MHz | — | 2010 MHz | 2110 MHz | — | 2200 MHz | FDD |
| 66 | 1710 MHz | — | 1780 MHz | 2110 MHz | — | 2200 MHz | FDD4 |
| 67 | N/A | | | 738 MHz | — | 758 MHz | FDD2 |
| 68 | 698 MHz | — | 728 MHz | 753 MHz | — | 783 MHz | FDD |

TABLE 3-continued

| E-UTRA Operating Band | Uplink (UL) operating band BS receive UE transmit F$_{UL\_low}$-F$_{UL\_high}$ | Downlink (DL) operating band BS transmit UE receive F$_{DL\_low}$-F$_{DL\_high}$ | Duplex Mode |
|---|---|---|---|
| 69 | N/A | 2570 MHz — 2620 MHz | FDD2 |
| 70 | 1695 MHz — 1710 MHz | 1995 MHz — 2020 MHz | FDD10 |
| 71 | 663 MHz — 698 MHz | 617 MHz — 652 MHz | FDD |
| 72 | 451 MHz — 456 MHz | 461 MHz — 466 MHz | FDD |
| 73 | 450 MHz — 455 MHz | 460 MHz — 465 MHz | FDD |
| 74 | 1427 MHz — 1470 MHz | 1475 MHz — 1518 MHz | FDD |
| 75 | N/A | 1432 MHz — 1517 MHz | FDD2 |
| 76 | N/A | 1427 MHz — 1432 MHz | FDD2 |
| 85 | 698 MHz — 716 MHz | 728 MHz — 746 MHz | FDD |
| 87 | 410 MHz — 415 MHz | 420 MHz — 425 MHz | FDD |
| 88 | 412 MHz — 417 MHz | 422 MHz — 427 MHz | FDD |

An operating band in NR is as follows.

Table 4 shows examples of operating bands on FRE Operating bands shown in Table 4 is a reframing operating band that is transitioned from an operating band of LTE/LTE-A. This operating band may be referred to as FR1 operating band.

TABLE 4

| NR operating band | Uplink (UL) operating band F$_{UL\_low}$-F$_{UL\_high}$ | Downlink (DL) operating band F$_{DL\_low}$-F$_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

TABLE 4-continued

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n97 | 2300 MHz-2400 MHz | N/A | SUL |
| n98 | 1880 MHz-1920 MHz | N/A | SUL |

Table 5 shows examples of operating bands on FR2. The following table shows operating bands defined on a high frequency. This operating band is referred to as FR2 operating band.

TABLE 5

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

<Maximum Output Power>

Power class 1, 2, 3, and 4 are specified based on UE types as follows:

TABLE 6

| UE Power class | UE type |
|---|---|
| 1 | Fixed wireless access (FWA) UE |
| 2 | Vehicular UE |
| 3 | Handheld UE |
| 4 | High power non-handheld UE |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 5A:
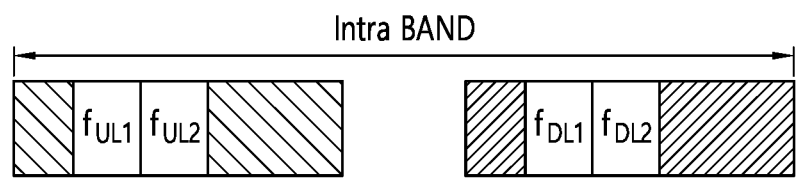
FIG. 5a illustrates a concept view of an example of intra-band contiguous CA.
Figure 5B:
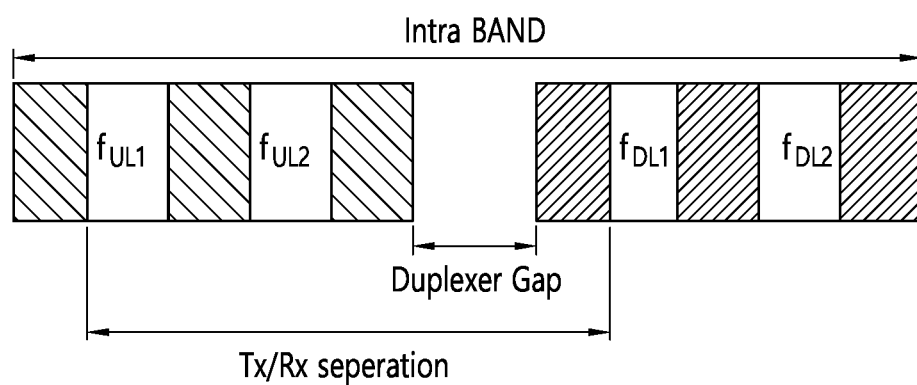
FIG. 5b illustrates a concept view of an example of intra-band non-contiguous CA.

FIG. 5a illustrates a concept view of an example of intra-band contiguous CA. FIG. 5b illustrates a concept view of an example of intra-band non-contiguous CA.

The CA may be split into the intra-band contiguous CA shown in FIG. 5a and the intra-band non-contiguous CA shown in FIG. 5b.

Figure 6A:
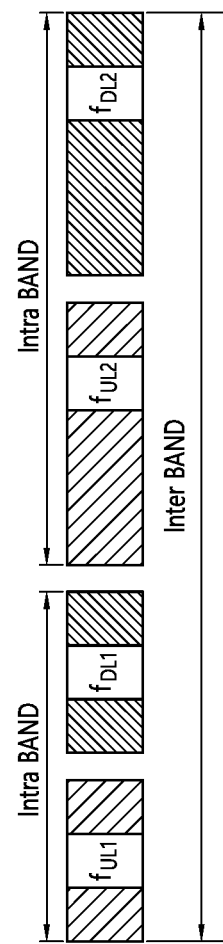
FIG. 6a illustrates a concept view of an example of a combination of a lower frequency band and a higher frequency band for inter-band CA.
Figure 6B:
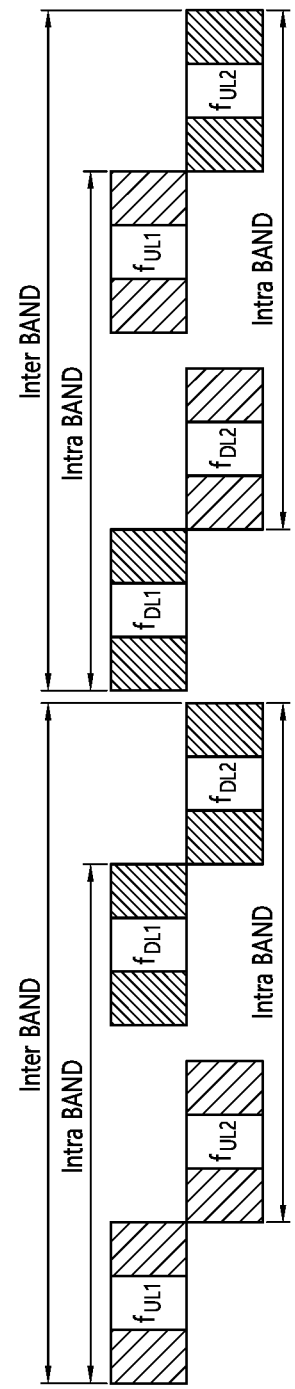
FIG. 6b illustrates a concept view of an example of a combination of similar frequency bands for inter-band CA.

FIG. 6a illustrates a concept view of an example of a combination of a lower frequency band and a higher frequency band for inter-band CA. FIG. 6b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 6a and inter-band CA of similar frequencies that may use a common RF terminal per component carrier due to similar RF (radio frequency) characteristics as shown in FIG. 6b.

For inter-band carrier aggregation, a carrier aggregation configuration is a combination of operating bands, each supporting a carrier aggregation bandwidth class.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 7A:
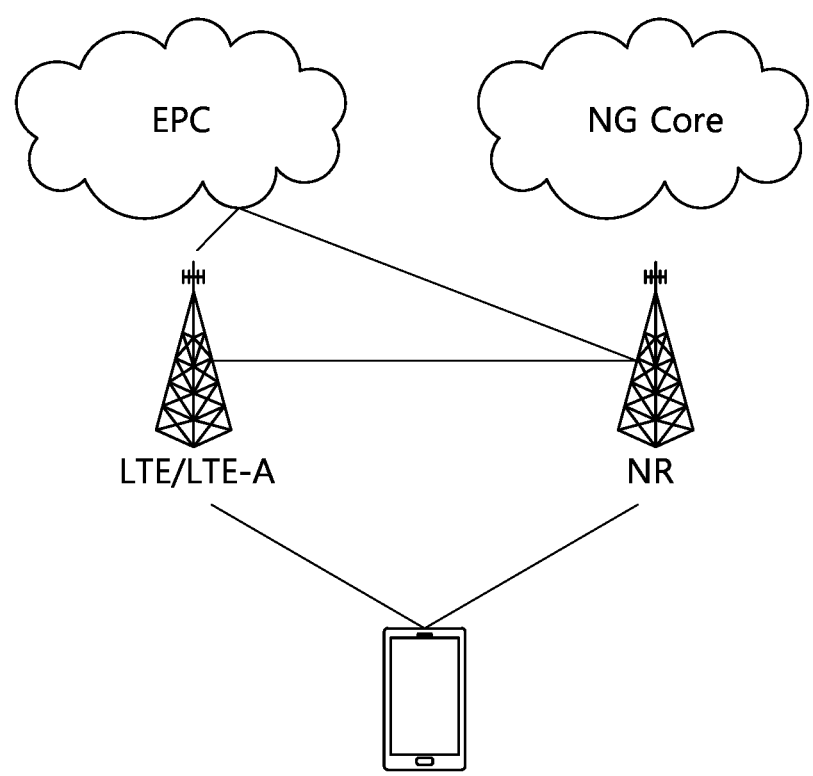
FIGS. 7a to 7c are exemplary diagrams illustrating exemplary architectures for services of the next generation mobile communication.
Figure 7B:
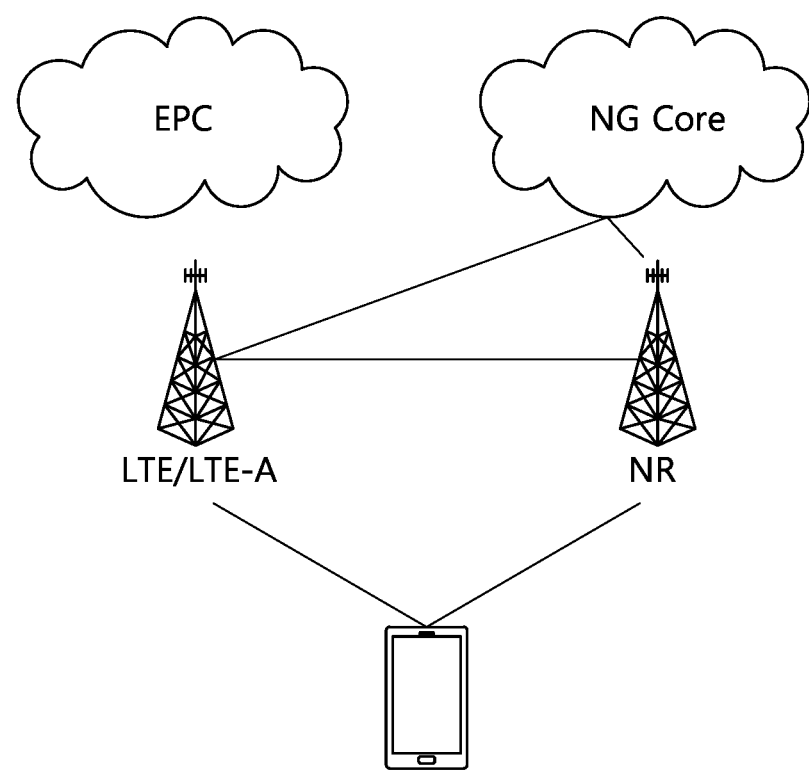
Figure 7C:
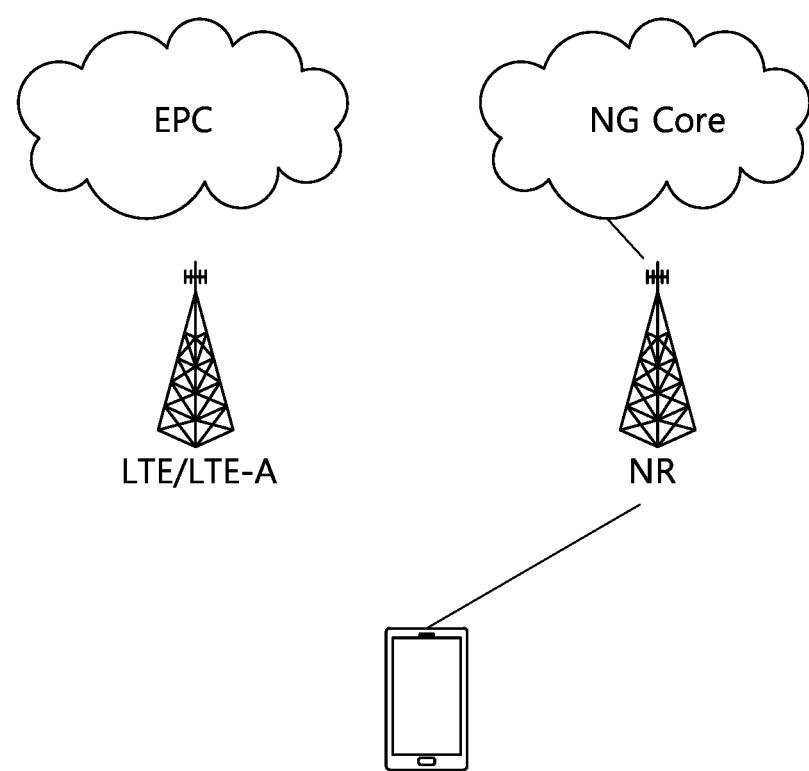

FIGS. 7a to 7c are exemplary diagrams illustrating exemplary architectures for services of the next generation mobile communication.

Referring to FIG. 7a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 7b, unlike FIG. 7a, the LTE/LTE-A based cell is connected to a core network for the 5G mobile communication, that is, a next generation (NG) core network.

The service scheme based on the architecture as illustrated in FIGS. 7a and 7b is called non-standalone (NSA).

Referring to FIG. 7c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 8:
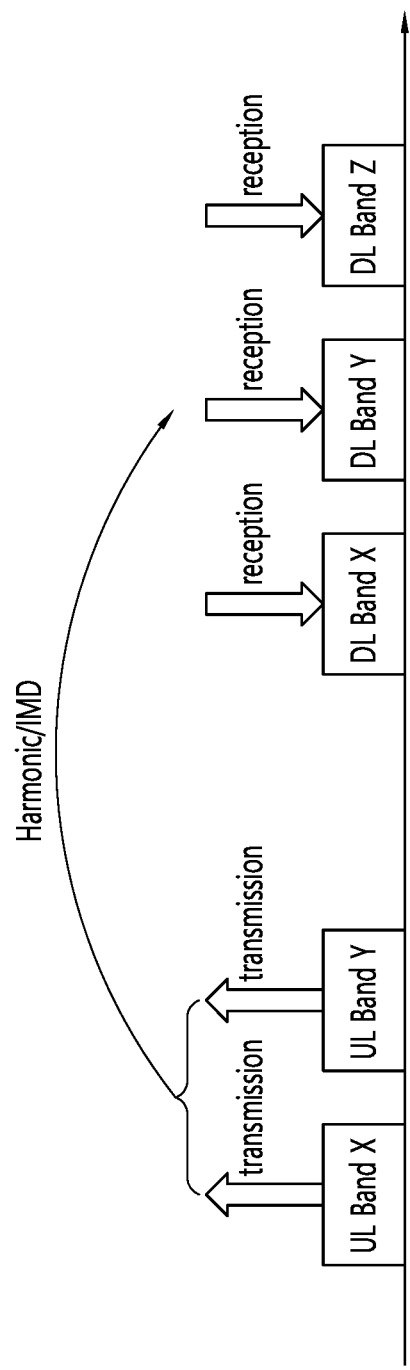
FIG. 8 illustrates an example of situation in which uplink signal transmitted via an uplink operating bands affects reception of a downlink signal via downlink operating bands.

FIG. 8 illustrates an example of situation in which uplink signal transmitted via an uplink operating bands affects reception of a downlink signal via downlink operating bands.

In FIG. 8, an Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 8, an example in which a CA is configured in a terminal is shown. For example, the terminal may perform communication through the CA based on three downlink operating bands (UL Band X, Y, Z) and two uplink operating bands (DL Band X, Y).

As shown in FIG. 8, in a situation in which three downlink operating bands are configured and two uplink operating bands are configured by the CA, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 8, when the terminal transmits the uplink signal, the harmonics component and the intermodulation distortion (IMD) component may occur, which may affect the downlink band of the terminal itself.

The terminal should be configured to satisfy a reference sensitivity power level (REFSENS) which is the minimum average power for each antenna port of the terminal when receiving the downlink signal.

When the harmonics component and/or IMD component occur as shown in the example of FIG. 8, there is a possibility that the REFSENS for the downlink signal may not be satisfied due to the uplink signal transmitted by the UE itself.

For example, the REFSENS may be set such that the downlink signal throughput of the terminal is 95% or more of the maximum throughput of the reference measurement channel. When the harmonics component and/or IMD component occur, there is a possibility that the downlink signal throughput is reduced to 95% or less of the maximum throughput.

<Disclosure of the Present Disclosure>

When a Power class 3 terminal performs NR CA or EN-DC operation, self-interference occurring in the UE is analyzed, and a relaxed standard for sensitivity thereof may be proposed.

Therefore, it is determined whether the harmonics component and the IMD component of the terminal occur, and when the harmonics component and/or IMD component occur, the maximum sensitivity degradation (MSD) value is defined for the corresponding frequency band, so relaxation for REFSENS in the reception band may be allowed in the reception band due to its own transmission signal. Here, the MSD may mean the maximum allowed reduction of the REFSENS. When the MSD is defined for a specific operating band of the terminal where the CA or DC is configured, the REFSENS of the corresponding operating band may be relaxed by the amount of the defined MSD.

The disclosure of the present specification provides results of analysis about self-interference in a terminal configured with CA and NR EN-DC and amount of relaxation to sensitivity.

I. Reference Sensitivity

The reference sensitivity power level REFSENS is the minimum mean power applied to each one of the UE antenna ports for all UE categories, at which the throughput shall meet or exceed the requirements for the specified reference measurement channel.

For EN-DC, E-UTRA and NR single carrier, CA, and MIMO operation of REFSENS requirements defined apply to all downlink bands of EN-DC configurations listed, unless sensitivity degradation exception is allowed in this clause of this specification. Allowed exceptions specified in this clause also apply to any higher order EN-DC configuration combination containing one of the band combinations that exception is allowed for. Reference sensitivity exceptions are specified by applying maximum sensitivity degradation (MSD) into applicable REFSENS requirement. EN-DC REFSENS requirements shall be met for NR uplink transmissions using QPSK DFT-s-OFDM waveforms as defined. Unless otherwise specified UL allocation uses the lowest SCS allowable for a given channel BW. Limits on configured maximum output power for the uplink shall apply.

In case of intra-band EN-DC the receiver REFSENS requirements in this clause do not apply for 1.4 and 3 MHz E-UTRA carriers. For the case of inter-band EN-DC with a single carrier per cell group and multi-carrier per cell group, in addition to the E-UTRA and NR single carrier, CA, and MIMO operation of REFSENS requirements defined the REFSENS requirements specified therein also apply with both downlink carriers and both uplink carriers active unless sensitivity exceptions are allowed in this clause of this specification.

For inter-band EN-DC, the reference sensitivity requirement with both uplink carriers active is allowed to be verified for only a single inter-band EN-DC configuration per NR band.

For intra-band contiguous EN-DC configurations, the reference sensitivity power level REFSENS is the minimum mean power applied to each one of the UE antenna ports at which the throughput for the carrier(s) of the E-UTRA and NR CGs shall meet or exceed the requirements for the specified E-UTRA and NR reference measurement channels. The reference sensitivity requirements apply with all uplink carriers and all downlink carriers active for EN-DC configuration and Uplink EN-DC configuration, as supported by the UE. For EN-DC configurations where uplink is not available in either the MCG or the SCG or for EN-DC configurations where the UE only supports single uplink operation, reference sensitivity requirements apply with single uplink transmission. The downlink carrier(s) from the cell group with uplink shall be configured closer to the uplink operating band than any of the downlink carriers from the cell group without uplink.

Sensitivity degradation is allowed for Intra-band contiguous EN-DC configurations, the reference sensitivity is defined only for the specific uplink and downlink test points and E-UTRA and NR single carrier requirements do not apply.

Sensitivity degradation is allowed for a band if it is impacted by UL harmonic interference from another band part of the same EN-DC configuration. Reference sensitivity exceptions for the victim band (high) are specified with uplink configuration of the aggressor band (low).

Sensitivity degradation is allowed for a band if it is impacted by receiver harmonic mixing due to another band part of the same EN-DC configuration. Reference sensitivity exceptions for the victim band (low) are specified with uplink configuration of the agressor band (high).

Sensitivity degradation is allowed for a band if it is impacted by UL of another band part of the same EN-DC configuration due to cross band isolation issues. Reference sensitivity exceptions for the victim band are specified with uplink configuration of the agressor band specified.

For EN-DC configurations in NR FR1 the UE may indicate capability of not supporting simultaneous dual uplink operation due to possible intermodulation interference overlapping in frequency to its own primary downlink channel bandwidth if
- the intermodulation order is 2;
- the intermodulation order is 3 when both operating bands are between 450 MHz-960 MHz or between 1427 MHz-2690 MHz In the case for EN-DC configurations in NR FR1 for which the intermodulation products caused by dual uplink operation do not interfere with its own primary downlink channel bandwidth as defined in Annex I the UE is mandated to operate in dual and triple uplink mode.

For these test points the reference sensitivity levels are relaxed by the amount of the parameter MSD.

II. MSD for DC

1. Summary of self-interference analysis for PC3 DC band combos

Tables 7 and 8 summarize the EN-DC band combinations with self-interference problems for 3DL/2UL EN-DC operation.

TABLE 7

| | | | | | |
|---|---|---|---|---|---|
| DC_30_n5-n77 | DC_30_n5 | 4th & 5th harmonic from n5 into n77 | 3rd IMD into n77 | — | 4th & 5th Harmonic issues already covered in DC_5A_n77A. FFS by 3rd IMD |
| | DC_30_n77 | — | 3rd & 5th IMDs into n5 | — | FFS |
| DC_3-3_n8-n78 | DC_3_n8 | 2nd harmonic from B3 into n78 4th harmonic from n8 into n78 | 3rd & 5th IMDs into n78 4th & 5th IMDs into B3 | — | The 3rd IMD problem, follow MSD (16.3 dB) for DC_3A_n8A-n78A. The 4th &5th IMDs problem already covered in DC_3A_n8A. |
| | DC_3_n78 | — | — | — | No issue |
| DC_7-7_n8-n78 | DC_7_n8 | 4th harmonic from n8 into n78 | 2nd & 4th IMDs into n78 | | 4th Harmonic issues already covered in DC_8A_n78A. The 2nd IMD problem, follow MSD (28.5 dB) for DC_7A_n8A-n78A. |
| | DC_7_n78 | — | 2nd IMD into n8 | | The 2nd IMDs problem, follow MSD (29.7 dB) for DC_7A_n8A-n78A. |
| DC_3_n1-n8 DC_3-3_n1-n8 | DC_3_n1 | — | — | Yes | Small freq. gap was covered in Table 7.3.1A-0bA in TS38.101-3 |
| | DC_3_n8 | — | — | — | No issue |
| DC_7_n1-n8 DC_7-7_n1-n8 | DC_7_n1 | — | 5th IMD into n8 | — | Reuse 4.5 dB by 5th IMD from DC_1A-28A n7A |
| | DC_7_n8 | 3rd harmonic from n8 into B7 | — | — | The harmonic issue already covered in DC_7A_n8A. |

TABLE 8

| Downlink band configuration | Uplink DC Configuration | Harmonic relation issues | intermodulation to own rx band | interference due to small frequency separation | MSD |
|---|---|---|---|---|---|
| DC_8_n28-n79 | DC_8A_n28A | 5th harmonic from B8 into n79 | 5th IMD | — | Harmonic problem already covered in DC_8A_n79A-FFS |
| | DC_8A_n79A | | 5th IMD | — | FFS |
| DC_8_n77-n79 | DC_8A_n77A | 5th harmonic from B8 into n79 | 2nd, 4th & 5th IMDs | | Harmonic problem already covered in DC_8A_n79A RAN4 agreed not to consider simultaneous Rx/Tx capability for the CA band combinations with n77 and n79. |
| | DC_8A_n79A | — | 2nd IMD | | RAN4 agreed not to consider simultaneous Rx/Tx capability for the CA band combinations with n77 and n79. |
| DC_8_n77-n257D/G/H/I | DC_8A_n77A | — | — | | No issues |
| | DC_8A_n257D/G/H/I | — | — | | No issues |
| DC_11_n77-n257D/G/H/I | DC_11A_n77A | — | — | | No issues |
| | DC_11A_n257D/G/H/I | — | — | | No issues |
| DC_2_n12-n77 DC_2-2_n12-n77 | DC_2A_n12A | 2nd harmonic from B2 into n77 | 3rd, 4th & 5th IMDs | — | Harmonic problem already covered in DC_2A_n77A 16.0 dB MSD by 3rd IMD from CA_n2-n12-n77 can be reused |
| | DC_2A_n77A | — | — | — | No issues |
| DC_7_n12-n77 | DC_7A_n12A | — | 3rd & 4th IMDs | — | FFS |
| | DC_7A_n77A | — | 2nd IMD | — | 30.8 dB MSD by 2nd IMD from DC_7A-12A_n78A can be reused |
| DC_66_n12-n77 | DC_66A_n12A | 2nd harmonic from B66 into n77 | 3rd, 4th & 5th IMDs | — | Harmonic problem already covered in DC_66A_n77A 16.0 dB MSD by 3rd IMD from CA_n12-n66-n77 can be reused |
| | DC_66A_n77A | | 3rd IMD | — | 15.2 dB MSD by 3rd IMD from DC_12A-66A_n77A can be reused |
| DC_12_n41-n66 | DC_12A_n41A | 3rd harmonic from B12 into n66 | — | — | Harmonic problem already covered in DC_12A_n66A |
| | DC_12A_n66A | — | 2nd IMD | — | Edge IMD2 regions will be impact in n41 28.7 dB MSD by 2nd IMD from DC_12A_n2A-n41A can be reused |
| DC_12_n66-n77 | DC_12A_n66A | 2nd harmonic from n66 into n77 | 3rd, 4th & 5th IMDs | — | Harmonic problem already covered in DC_66A_n77A 16.0 dB MSD by 3rd IMD from CA_n12-n66-n77 can be reused |

TABLE 8-continued

| Downlink band configuration | Uplink DC Configuration | Harmonic relation issues | intermodulation to own rx band | interference due to small frequency separation | MSD |
|---|---|---|---|---|---|
| | DC_12A_n77A | 3rd harmonic from B12 into n66 | 3rd & 4th IMDs | — | Harmonic problem already covered in DC_12A_n66A 13.2 dB MSD by 3rd IMD from DC_12A-66A_n77A can be reused |
| DC_71_n66-n77 | DC_71A_n66A | 2nd harmonic from n66 into n77 5th harmonic from B71 into n77 | 3rd, 4th & 5th IMDs | — | Harmonic problem already covered in DC_66A_n77A or DC_71A_n77A 15.9 dB MSD by 3rd IMD from CA_n66-n71-n77 can be reused |
| | DC_71A_n77A | — | 3rd & 4th IMDs | — | 15.5 dB MSD by 3rd IMD from DC_71A_n66A-n78A can be reused |
| DC_2_n71-n77 DC_2-2_n71-n77 | DC_2A_n71A | 2nd harmonic from B2 into n77 5th harmonic from n71 into n77 | 3rd, 4th & 5th IMDs | — | Harmonic problem already covered in DC_2A_n77A or DC_71A_n77A 8.0 dB MSD by 3rd IMD from DC_2A_n71A-n78A can be reused |
| | DC_2A_n77A | — | — | — | No issues |
| DC_7_n71-n77 | DC_7A_n71A | 5th harmonic from n71 into n77 | 3rd & 4th IMDs | — | Harmonic problem already covered in DC_71A_n77A FFS |
| | DC_7A_n77A | — | — | — | No issues |
| DC_66_n71-n77 | DC_66A_n71A | 2nd harmonic from B66 into n77 5th harmonic from n71 into n77 | 3rd, 4th & 5th IMDs | — | Harmonic problem already covered in DC_66A_n77A or DC_71A_n77A 15.9 dB MSD by 3rd IMD from CA_n66-n71-n77 can be reused |
| | DC_66A_n77A | — | 3rd IMD | — | 15.2 dB MSD by 3rd IMD from DC_12A-66A_n77A can be reused |
| DC_5_n2-n41 | DC_5A_n2A | 3rd harmonic from B5 into n41 | 2nd IMD | — | Harmonic problem already covered in DC_5A_n41A FFS |
| | DC_5A_n41A | — | — | — | No issues |
| DC_5_n2-n66 | DC_5A_n2A | — | 4th IMD | — | 7.2 dB MSD by 4th IMD from CA_n2-n5-n66 can be reused |
| | DC_5A_n66A | — | — | — | No issues |
| DC_12_n2-n66 | DC_12A_n2A | 3rd harmonic from B12 into n66 | — | — | Harmonic problem already covered in DC_12A_n66A |
| | DC_12A_n66A | — | 4th IMD | — | 0 dB MSD in DC_2A-12A_n66A in TS38.101-3 |
| DC_7_n2-n77 | DC_7A_n2A | 2nd harmonic from n2 into n77 | 5th IMD | — | Harmonic problem already covered in DC_2A_n77A 4.2 dB MSD by 5th IMD from |

TABLE 8-continued

| Downlink band configuration | Uplink DC Configuration | Harmonic relation issues | intermodulation to own rx band | interference due to small frequency separation | MSD |
|---|---|---|---|---|---|
| | DC_7A_n77A | — | 4th IMD | — | DC_2A_n7A-n78A can be reused 8.6 dB MSD by 4th IMD from DC_2A-7A_n78A can be reused |
| DC_12_n2-n77 | DC_12A_n2A | 2nd harmonic from n2 into n77 | 3rd, 4th & 5th IMDs | — | Harmonic problem already covered in DC_2A_n77A 16.0 dB MSD by 3rd IMD from CA_n2-n12-n77 can be reused |
| | DC_12A_n77A | — | 3rd & 4th IMDs | — | 16.5 dB MSD by 3rd IMD from DC_2A-12A_n77A can be reused |
| DC_71_n2-n77 | DC_71A_n2A | 2nd harmonic from n2 into n77 5th harmonic from B71 into n77 | 3rd, 4th & 5th IMDs | — | Harmonic problem already covered in DC_2A_n77A or DC_71A_n77A 8.0 dB MSD by 3rd IMD from DC_2A_n71A-n78A can be reused |
| | DC_71A_n77A | — | 3rd & 4th IMDs | — | 16.5 dB MSD by 3rd IMD from DC_2A-71A_n78A can be reused |
| DC_5_n2-n78 | DC_5A_n2A | 2nd harmonic from n2 into n78 4th harmonic from B5 into n78 | 3rd IMD | — | Harmonic problem already covered in DC_2A_n78A or DC_5A_n78A 16.0 dB MSD by 3rd IMD from DC_2A_n5A-n77A can be reused |
| | DC_5A_n78A | | 3rd IMD | | 16.5 dB MSD by 3rd IMD from DC_2A-5A_n77A can be reused |
| DC_12_n2-n78 | DC_12A_n2A | 2nd harmonic from n2 into n78 | 3rd IMD | — | Harmonic problem already covered in DC_2A_n77A MSD will follow from DC_12_n2-n77 |
| | DC_12A_n78A | — | 3rd IMD | — | MSD will follow from DC_12_n2-n77 |
| DC_2-2_n41-n66 | DC_2A_n41A | — | — | — | No issues |
| | DC_2A_n66A | — | — | — | No issues |
| DC_2-2_n41-n71 | DC_2A_n41A | — | 2nd & 5th IMDs | — | 28.7 dB MSD by 2nd IMD from DC_2A_n41A-n71A can be reused |
| | DC_2A_n71A | 4th harmonic from n71 into n41 | — | — | Harmonic problem already covered in DC_71A_n41A |
| DC_2-2_n66-n78 | DC_2A_n66A | 2nd harmonic from B2 or n66 into n78 | 2nd & 4th IMDs into n78 | | Harmonic issue already covered in DC_2_n78 or CA_n66-n78 29.4 dB and 8.9 dB MSD by 2nd & 4th IMDs in DC_2A_n66A-n78A can be reused in Table 7.3B.2.3.5.2-1 in TS38.101-3 |

TABLE 8-continued

| Downlink band configuration | Uplink DC Configuration | Harmonic relation issues | intermodulation to own rx band | interference due to small frequency separation | MSD |
|---|---|---|---|---|---|
| | DC_2A_n78A | — | 4th IMD into n66 | — | 10.3 dB MSD by 4th IMD in DC_2A-66A_n78A can be reused in Table 7.3B.2.3.5.2-1 in TS38.101-3 |
| DC_2-5_n2-n41 | DC_2A_n2A | — | — | — | No issues when RAN4 only consider the single switched uplink transmission |
| | DC_2A_n41A | — | — | — | No issue |
| | DC_5A_n2A | 3rd harmonics from n2 into n41 | 2nd IMD into n41 | | Harmonic issue already covered in DC_2_n41 FFS |
| | DC_5A_n41A | — | — | — | No issues |
| DC_2-12_n2-n41 | DC_2A_n2A | — | — | — | No issues when RAN4 only consider the single switched uplink transmission |
| | DC_2A_n41A | — | 2nd & 5th IMDs into B12 | — | 28.7 dB MSD by 2nd IMD from DC_2A-12A_n41A can be reused |
| | DC_12A_n2A | 3rd harmonics from n2 into n41 | 2nd IMD into n41 | | Harmonic issue already covered in DC_2_n41 28.7 dB by IMD2 from DC_12A_n2A-n41A can be reused |
| | DC_12A_n41A | — | 2nd IMD into B2 and n2 | — | 26.0 dB MSD by 2nd IMD from DC_2A-12A_n41A can be reused |
| DC_2-66_n2-n41 | DC_2A_n2A | — | — | — | No issues |
| | DC_2A_n41A | — | — | — | No issues |
| | DC_66A_n2A | — | — | — | No issues |
| | DC_66A_n41A | | 4th IMD into B2 and n2 | | 11.0 dB MSD by 2nd IMD from DC_2A-66A_n41A can be reused |
| DC_2-71_n2-n41 | DC_2A_n2A | — | — | — | No issues |
| | DC_2A_n41A | — | 2nd & 5th IMDs into B71 | — | 28.7 dB MSD by 2nd IMD from DC_2A_n41A-n71A can be reused |
| | DC_71A_n2A | 4th harmonic from B71 into n41 | — | — | Harmonic problem already covered in DC_71A_n41A |
| | DC_71A_n41A | 3rd harmonic from B71 into B2/n2 | 2nd IMD into B2 and n2 | — | Harmonic issue already covered in DC_2_n71 26.0 dB MSD by DC_71A_n2A-n41A can be reused in TS38.101-3 |
| DC_2-5_n2-n66 | DC_2A_n2A | — | — | — | No issues |
| | DC_2A_n66A | — | — | — | No issues |
| | DC_5A_n2A | — | 4th IMD into n66 | — | 7.2 dB MSD by 4th IMD from CA_n2-n5-n66 can be reused |
| | DC_5A_n66A | — | — | — | No issues |
| DC_2-7_n2-n66 | DC_2A_n2A | — | — | — | No issues |
| | DC_2A_n66A | — | — | — | No issues |
| | DC_7A_n2A | — | — | — | No issues |
| | DC_7A_n66A | — | — | — | No issues |

TABLE 8-continued

| Downlink band configuration | Uplink DC Configuration | Harmonic relation issues | intermodulation to own rx band | interference due to small frequency separation | MSD |
|---|---|---|---|---|---|
| DC_2-12_n2-n66 | DC_2A_n2A | — | — | — | No issues |
| | DC_2A_n66A | — | — | — | No issues |
| | DC_12A_n2A | 3rd harmonics from B12 into n66 | — | — | Harmonic problem already covered in DC_12A_n66A |
| | DC_12A_n66A | — | 4th IMD into B2 and n2 | — | 0 dB MSD in DC_2A-12A_n66A in TS38.101-3 |
| DC_2-71_n2-n66 | DC_2A_n2A | — | — | — | No issues |
| | DC_2A_n66A | — | — | — | No issues |
| | DC_71A_n2A | — | — | — | No issues |
| | DC_71A_n66A | 3rd harmonics from B71 into B2 and n2 | — | — | Harmonic problem already covered in DC_2A_n71A |
| DC_2-7_n2-n71 | DC_2A_n2A | — | — | — | No issues |
| | DC_2A_n71A | — | — | — | No issues |
| | DC_7A_n2A | — | 2nd & 5th IMDs into n71 | — | 28.7 dB MSD for 2nd IMD of DC_7A_n2A-n71A can be reused in TS38.101-3 |
| | DC_7A_n71A | 3rd harmonics from n71 into B2 and n2 | — | — | Harmonic problem already covered in DC_2A_n71A |
| DC_2-66_n2-n71 | DC_2A_n2A | — | — | — | No issues |
| | DC_2A_n71A | — | — | — | No issues |
| | DC_66A_n2A | — | — | — | No issues |
| | DC_66A_n71A | 3rd harmonics from B71 into B2 and n2 | — | — | Harmonic problem already covered in DC_2A_n71A |
| DC_2-7_n2-n77 | DC_2A_n2A | 2nd harmonic from B2 into n77 | 2nd & 4th IMDs into n77 | — | Harmonic problem already covered in DC_2A_n77A Only switched uplink transmission is allowed |
| | DC_2A_n77A | — | 5th IMD into B7 | | 3.4 dB MSD for 5th IMD of DC_2A-7A_n77A can be reused in TS38.101-3 |
| | DC_7A_n2A | 2nd harmonic from n2 into n77 | 5th IMD into n77 | | Harmonic problem already covered in DC_2A_n77A 4.2 dB MSD for 5th IMD of DC_2A_n7A-n78A can be reused in TS38.101-3 |
| | DC_7A_n77A | — | 4th IMD into B2 and n2 | — | 8.6 dB MSD for 4th IMD of DC_2A-7A_n77A can be reused in TS38.101-3 |
| DC_2-12_n2-n77 | DC_2A_n2A | 2nd harmonic from B2 into n77 | 2nd & 4th IMDs into n77 | — | Harmonic problem already covered in DC_2A_n77A Only switched uplink transmission is allowed |
| | DC_2A_n77A | — | — | | No issues |
| | DC_12A_n2A | 2nd harmonic from n2 into n77 | 3rd, 4th & 5th IMDs into n77 | — | Harmonic problem already covered in DC_2A_n77A 16.0 dB MSD by 3rd IMD from |

TABLE 8-continued

| Downlink band configuration | Uplink DC Configuration | Harmonic relation issues | intermodulation to own rx band | interference due to small frequency separation | MSD |
|---|---|---|---|---|---|
| | DC_12A_n77A | — | 3rd & 4th IMDs into B2 and n2 | — | CA_n2-n12-n77 can be reused 16.5 dB MSD by 3rd IMD from DC_2A-12A_n77A can be reused |
| DC_2-71_n2-n77 | DC_2A_n2A | 2nd harmonic from B2 into n77 | 2nd & 4th IMDs into n77 | — | Harmonic problem already covered in DC_2A_n77A Only switched uplink transmission is allowed |
| | DC_2A_n77A | | | | No issues |
| | DC_71A_n2A | 2nd harmonic from n2 into n77 5th harmonic from B71 into n77 | 3rd, 4th & 5th IMDs into n77 | — | Harmonic problem already covered in DC_2A_n77A or DC_71A_n77A 8.0 dB MSD |
| | DC_71A_n77A | — | 3rd & 4th IMDs into B2 and n2 | — | 16.5 dB MSD by 3rd IMD from DC_2A-71A_n78A can be reused |
| DC_2-5_n2-n78 | DC_2A_n2A | 2nd harmonic from B2 into n78 | 2nd & 4th IMDs into n78 | — | Harmonic problem already covered in DC_2A_n78A Only switched uplink transmission is allowed |
| | DC_2A_n78A | | 5th IMD into B5 | — | 3.8 dB by 5th IMD from DC_2A-5A_n77A can be reused |
| | DC_5A_n2A | 2nd harmonic from n2 into n78 4th harmonic from B5 into n78 | 3rd IMD into n78 | — | Harmonic problem already covered in DC_2A_n78A or DC_5A_n78A 16.0 dB MSD by 3rd IMD from DC_2A_n5A-n77A can be reused |
| | DC_5A_n78A | | 3rd IMD into B2 and n2 | | 16.5 dB MSD by 3rd IMD from DC_2A-5A_n77A can be reused |
| DC_2-66_n2-n78 | DC_2A_n2A | 2nd harmonic from B2 into n78 | 2nd & 4th IMDs into n78 | — | Harmonic problem already covered in DC_2A_n78A Only switched uplink transmission is allowed |
| | DC_2A_n78A | — | 4th IMD into n66 | — | 10.3 dB MSD by 4th IMD in DC_2A-66A_n78A can be reused in Table 7.3B.2.3.5.2-1 in TS38.101-3 |
| | DC_66A_n2A | 2nd harmonic from n2 into n78 | 2nd & 4th IMDs into n78 | | Harmonic issue already covered in DC_2_n78 or CA_n66-n78 29.4 dB and 8.9 dB MSD by 2nd & 4th IMDs in DC_2A_n66A-n78A can be reused in Table 7.3B.2.3.5.2-1 in TS38.101-3 |

TABLE 8-continued

| Downlink band configuration | Uplink DC Configuration | Harmonic relation issues | intermodulation to own rx band | interference due to small frequency separation | MSD |
|---|---|---|---|---|---|
| | DC__66A__n78A | | 2nd, 4th & 5th IMDs into B2 and n2 | | 32.1 dB MSD by 2nd IMD from DC__2A-66A__n78A can be reused |
| DC__38__n3-n78 | DC__38A__n3A | 2nd harmonic from n3 into n78 | 3rd IMD into n78 | | Harmonic issue already covered in DC__3__n78 16.1 dB MSD by 3rd IMD from DC__3A__n7A-n78A can be reused |
| | DC__38A__n78A | | 3rd & 4th IMDs into n3 | | 17.6 dB MSD by 3rd IMD from DC__3A-7A__n78A can be reused |
| DC__1__n38-n78 | DC__1A__n78A | — | 4th IMD into n38 | | 9.1 dB MSD by 4th IMD from DC__1A-7A__n78A can be reused |
| DC__3__n38-n78 | DC__3A__n78A | — | — | | No issues |
| DC__7__n38-n78 | — | — | — | | No issues |
| DC__20__n38-n78 | DC__20A__n78A | 3rd harmonic from B20 into n38 | 2nd IMD into n38 | — | Harmonic issue already covered in DC__20__n38 30.8 dB MSD by 2nd IMD from DC__7A-20A__n78A can be reused |
| DC__1__n28-n75 | DC__1A__n28A | 2nd harmonic from n28 into n75 | — | — | Harmonic issue already covered in DC__28__n75 |
| DC__3__n28-n75 | DC__3A__n28A | 2nd harmonic from n28 into n75 | 5th IMD into n75 | — | Harmonic issue already covered in DC__28__n75 FFS |
| DC__20__n8-n78 | DC__20A__n8A | 4th harmonic from B20 or n8 into n78 | 4th IMD into n78 | | Harmonic issue already covered in DC__20__n78 or DC__8__n78 10.3 dB reuse by 4th IMD of DC__8A__n28A-n78A |
| | DC__20A__n78A | — | 4th IMD into n8 | | 12.1 dB reuse by 4th IMD of DC__8A-20A__n78A |
| DC__1__n3-n8 | DC__1A__n3A | — | — | Yes | Cross band isolation issues already solved |
| | DC__1A__n8A | 2nd harmonic from n8 into n3 | — | Yes | Harmonic issue already covered in DC__8__n3A Cross band isolation issues already solved |
| DC__1__n8-n77 DC__1__n8-n77(2A) DC__n8-n77__1 DC__n8-n77(2A)__1 | DC__1A__n8A or DC__n8A__1A | | 3rd IMD into n77 | — | 14.9 dB MSD by 3rd IMD of DC__1A__n8A-n78A can be reused. |
| | DC__1A__n77A or DC__n77A__1A | — | 5th IMD into n8 | — | 3.3 dB MSD by 5th IMD of DC__1A-8A__n77A can be reused. |
| DC__1-3__n3-n8 | DC__1A__n3A | — | — | Yes | Cross band isolation issues already solved |
| | DC__1A__n8A | 2nd harmonic from n8 into n3 | — | Yes | Harmonic issue already covered in DC__8__n3A Cross band isolation issues already solved |
| | DC__(n)3AA | — | — | — | No issues |
| | DC__3A__n8A | — | — | — | No issues |

TABLE 8-continued

| Downlink band configuration | Uplink DC Configuration | Harmonic relation issues | intermodulation to own rx band | interference due to small frequency separation | MSD |
|---|---|---|---|---|---|
| DC_3_n3-n77<br>DC_3_n3-n77(2A)<br>DC_n3-n77_3<br>DC_n3-n77(2A)_3 | DC__(n)3AA | 2nd harmonic from n3 into n77 | 2nd & 4th IMD into n77 | — | Harmonic problems was already covered in DC_3A_n77A. Due to apply MPR, no need to define MSD |
| | DC_3A_n77A<br>DC_n77A_3A | — | 2nd, 4th &5th IMD into n3 | — | MSD problems in n3 were already solved in DC_3A_n77A |
| DC_3_n3-n8<br>DC_n3-n8_3 | DC__(n)3AA<br>DC_3A_n8A or<br>DC_n8A_3A | —<br>— | —<br>— | —<br>— | No issues<br>No issues |
| DC_3_n8-n77<br>DC_3_n8-n77(2A)<br>DC_n8-n77_3<br>DC_n8-n77(2A)_3 | DC_3A_n8A or<br>DC_n8A_3A | 2nd harmonic from B3 into n77<br>4th harmonic from n8 into n77 | 3rd & 5th IMDs into n77 | — | Harmonic problems was already covered in DC_3A_n77A or DC_8A_n77A. 16.3 dB MSD by 3rd IMD in DC_3A_n8A-n78A can be reused |
| | DC_3A_n77A or<br>DC_n77A_3A | — | 4th IMD into n8 | — | 9.7 dB MSD by 4th IMD in DC_3A-8A_n77A can be reused |
| DC_8-3_n3-n77<br>DC_8-3_n3-n77(2A) | DC__(n)3AA | 2nd harmonic from B3 into n77 | 2nd & 4th IMDs into n77 | — | Harmonic problems was already covered in DC_3A_n77A Due to apply MPR, no need to define MSD |
| | DC_3A_n77A | — | 4th IMD into n8 | — | 9.7 dB MSD by 4th IMD in DC_3A-8A_n77A can be reused |
| | DC_8A_n3A | 2nd harmonic from B3 into n77<br>4th harmonic from n8 into n77 | 3rd & 5th IMDs into n77 | — | Harmonic problems was already covered in DC_3A_n77A or DC_8A_n77A. 16.3 dB MSD by 3rd IMD in DC_3A_n8A-n78A can be reused |
| | DC_8A_n77A | 2nd harmonic from B8 into B3 | 3rd IMD into B3 and n3 | — | Harmonic problems was already covered in DC_3A_n8A 16.5 dB MSD by 3rd IMD in DC_3A-8A_n77A can be reused |
| DC_1-3_n3-n257A/G/H/I/J/K/L/M | DC_1A_n3A | — | — | Yes | Cross band isolation issues already solved |
| | DC_1A_n257A | — | — | Yes | Cross band isolation issues already solved |
| | DC__(n)3AA | — | — | — | No issues |
| | DC_3A_n257A | — | — | — | No issues |
| DC_1_n77-n257J/K/L/M<br>DC_1_n77(2A)-n257J/K/L/M<br>DC_n77-n257_1<br>DC_n77(2A)-n257_1 | DC_1A_n77A or<br>DC_n77A_1A<br>DC_1A_n257A or<br>DC_n257A_1A | — | — | — | No issues<br><br>No issues |
| DC_1_n8-n257A/G/H/I/J/K/L/M | DC_1A_n8A or<br>DC_n8A_1A | — | — | — | No issues |
| DC_n8-n257_1 | DC_1A_n257A or<br>DC_n257A_1A | — | — | — | No issues |

TABLE 8-continued

| Downlink band configuration | Uplink DC Configuration | Harmonic relation issues | intermodulation to own rx band | interference due to small frequency separation | MSD |
|---|---|---|---|---|---|
| DC__3__n3-n257A/ G/H/I/J/K/L/M DC_n3-n257__3 | DC__(n)3AA DC__3A__n257A or DC__n257A__3A | — — | — — | — — | No issues No issues |
| DC__3__n77-n257J/ K/L/M, DC__3__n77(2A)-n257J/ K/L/M DC__n77-n257__3 DC__n77(2A)-n257__3 | DC__3A__n77A or DC__n77A__3A DC__3A__n257A or DC__n257A__3A | — — | — — | — — | No issues No issues |
| DC__3__n8-n257A/ G/H/I/J/K/L/M DC__n8-n257__3 | DC__3A__n8A or DC__n8A__3A DC__3A__n257A or DC__n257A__3A | — — | — — | — — | No issues No issues |
| DC__8__n3-n257A/ G/H/I/J/K/L/M | DC__8A__n3A DC__8A__n257A | — 2nd harmonic from B8 into n3 | — — | — — | No issues Harmonic problems was already covered in DC__3A__n8A |
| DC__8-3__n3-n257A/ G/H/I/J/K/L/M | DC__8A__n3A DC__8A__n257A DC__(n)3AA DC__3A__n257A | — 2nd harmonic from B8 into n3 — — | — — — — | — — — — | No issues Harmonic problems was already covered in DC__3A__n8A No issues No issues |
| DC__n3-n257A/ G/H/I/J/K/L/ M__1-3 | DC__n3A__1A DC__(n)3AA DC__n257A__1A DC__n257A__3A | — — — — | — — — — | Yes — Yes — | Cross band isolation issues already solved No issues Cross band isolation issues already solved No issues |
| DC__n3-n77__1-3 DC__n3-n77(2A)__1-3 | DC__n3A__1A | 2nd harmonic from B1 or n3 into n77 | 2nd & 4th IMDs into n77 | Yes | Harmonic problems already covered in DC__n3A-n78A. Same as IMD issues in DC__1A__n3A-n78A Small freq. gap was covered in Table 7.3.1A-0bA inTS36.101 |
| | DC__(n)3AA | 2nd harmonic from B3 into n77 | 2nd & 4th IMDs into n77 | | Harmonic problems was already covered in DC__3A__n77A Due to apply MPR, no need to define MSD |
| | DC__n77A__1A | — | 2nd , 4th & 5th IMDs into B3/n3 | — | Same as IMD issues in DC__1A__n3A-n78A |
| | DC__n77A__3A | — | 2nd & 5 th IMD into B1 2nd, 4th &5th IMD into n3 | — | 31.0 dB by 2nd IMD that follow DC__1A-3A__n77A in TR37.863-02-01 in rel-15. Follow DC__3A__n1A-n78A for 5th IMD problem. MSD problems in n3 were already solved in DC__3A__n77A |

TABLE 8-continued

| Downlink band configuration | Uplink DC Configuration | Harmonic relation issues | intermodulation to own rx band | interference due to small frequency separation | MSD |
|---|---|---|---|---|---|
| DC_n3-n8_1 | DC_n3A_1A | — | — | Yes | Cross band isolation issues already solved |
| | DC_n8A_1A | 2nd harmonic from n8 into n3 | — | Yes | Harmonic issue already covered in DC_8_n3A Cross band isolation issues already solved |
| DC_n3-n8_1-3 | DC_n3A_1A | — | — | Yes | Cross band isolation issues already solved |
| | DC_(n)3AA | — | — | — | No issues |
| | DC_n8A_1A | 2nd harmonic from n8 into n3 | — | Yes | Harmonic issue already covered in DC_8_n3A Cross band isolation issues already solved |
| | DC_n8A_3A | — | — | — | No issues |

2. MSD Analysis

For the MSD analysis of these 3DL/2UL EN-DC NR UE, it is assumed that the parameters and attenuation levels based on current UE RF FE components as shown in below tables.

In rel-17 DC of LTE×Bands (xDL/1UL, x=1, 2, 3, 4) and NR 2 Bands (2DL/1UL) basket WI, RAN4 also consider shared antenna RF architectures for NSA UE in sub-6 GHz as LTE system. So we consider shared antenna RF architecture for general NSA DC UE to derive MSD levels. Also separate antenna RF architecture is considered in some specific band combinations which was considered in general NR RF session.

For the MSD analysis of these several DC band combinations between LTE and NR, we assume the following parameters and attenuation levels based on current UE RF FE components.

Table 9 shows the RF Front-end component parameters.

Table 10 shows the isolation levels according to the RF component.

Table 10 shows UE RF Front-end component isolation parameters.

TABLE 10

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Based on these assumptions and test configuration, the present disclosure proposes the MSD levels as below.

Table 11 shows a proposed MSD test configuration and results by IMD problems

TABLE 9

| UE ref. architecture Component | Triplexer-Diplexer Architecture w/single ant. or dual ant. DC_8A_n28A-n79A, DC_7A_n12A-n77A, DC_7A_n71A-n77A, DC_30A_n5A-n77A | | | | Cascaded Diplexer Architecture w/single ant. DC_5A_n2A-n41A, DC_2A-5A_n2A-n41A, DC_3A_n28A-n75A | | | |
|---|---|---|---|---|---|---|---|---|
| | IP2 (dBm) | IP3 (dBm) | IP4 (dBm) | IP5 (dBm) | IP2 (dBm) | IP3 (dBm) | IP4 (dBm) | IP5 (dBm) |
| Ant. Switch | 112 | 68 | 55 | 55 | 112 | 68 | 55 | 55 |
| Triplexer | 110 | 72 | 55 | 52 | | | | |
| Quadplexer | | | | | 112 | 72 | 55 | 52 |
| Diplexer | 115 | 87 | 55 | 55 | 115 | 87 | 55 | 55 |
| Duplexer | 100 | 75 | 55 | 53 | 100 | 75 | 55 | 53 |
| PA Forward | 28.0 | 32 | 30 | 28 | 28.0 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

TABLE 11

| NR CA inter-bands | UL DC | IMD | IMD | UL Fc (MHz) | UL BW (MHz) | UL RB # | DL Fc (MHz) | DL BW (MHz) | MSD (dB) |
|---|---|---|---|---|---|---|---|---|---|
| DC_8A_n28A-n79A | 8 | IMD5 | \|fn28 + 4*fB8\| | 912.5 | 5 | 25 | 957.5 | 5 | N/A |
|  | n28 |  |  | 745.5 | 5 | 25 | 800.5 | 5 |  |
|  | n79 |  |  | 4420 | 40 | 216 | 4420 | 40 | 0.0 |
|  | 8 | IMD5 | \|fn79 − 4*fB8\| | 905 | 5 | 25 | 950 | 5 | N/A |
|  | n79 |  |  | 4420 | 40 | 216 | 4420 | 40 |  |
|  | n28 |  |  | 745 | 5 | 25 | 800 | 5 | 3.9 |
| DC_7A_n12A-n77A | B7 | IMD3 | \|2*fn12 + fB7\| | 2520 | 10 | 50 | 2640 | 10 | N/A |
|  | n12 |  |  | 708 | 5 | 25 | 738 | 5 |  |
|  | n77 |  |  | 3936 | 10 | 50 | 3936 | 10 | 15.2 |
| DC_7A_n71A-n77A | B7 | IMD3 | \|2*fn71 + fB7\| | 2520 | 10 | 50 | 2640 | 10 | N/A |
|  | n71 |  |  | 693 | 5 | 25 | 647 | 5 |  |
|  | n77 |  |  | 3906 | 10 | 50 | 3906 | 10 | 15.2 |
| DC_5A_n2A-n41A or DC_2A-5A_n2A-n41A | B5 | IMD2 | \|fB5 + fn2\| | 829 | 5 | 25 | 874 | 5 | N/A |
|  | n2 |  |  | 1855 | 5 | 25 | 1935 | 5 |  |
|  | n41 |  |  | 2684 | 5 | 25 | 2684 | 5 | 29.7 |
| DC_3A_n28A-n75A | B3 | IMD5 | \|3*fn28 − 2*fB3\| | 1780 | 5 | 25 | 1875 | 5 | N/A |
|  | n28 |  |  | 708 | 5 | 25 | 763 | 5 |  |
|  | n75 |  |  | — | — | — | 1436 | 5 | 3.3 |

Offset of MSD values in table 10 is ±α, and a may be 0, 0.1, 0.2, 0.3, 0.4, 0.5, 0.6, 0.7, . . . , 2.7.

3. MSD value (1) DC_30_n5-n77 there may be IMD3 produced by Band 30 and NR band n5 that impact the reference sensitivity of NR band n77. Also there are IMD3 & IMD5 produced by Band 30 and NR band n77 that impact the reference sensitivity of NR band n5.

The required MSD levels and test configuration are shown in the following Table.

TABLE 12

| DC bands | UL DC | IMD | IMD | UL $F_c$ (MHz) | UL BW (MHz) | UL RB # | DL $F_c$ (MHz) | DL BW (MHz) | MSD (dB) |
|---|---|---|---|---|---|---|---|---|---|
| DC_30A_n5A-n77A | B30 | IMD3 | \|2*$f_{B30}$ − $f_{n5}$\| | 2310 | 5 | 25 | 2355 | 5 | N/A |
|  | n5 |  |  | 834 | 5 | 25 | 879 | 5 |  |
|  | n77 |  |  | 3786 | 10 | 50 | 3786 | 10 | 16.1 |
|  | B30 | IMD3 | \|2*$f_{B30}$ − $f_{n77}$\| | 2310 | 5 | 25 | 2355 | 5 | N/A |
|  | n77 |  |  | 3741 | 10 | 50 | 3741 | 10 |  |
|  | n5 |  |  | 834 | 5 | 25 | 879 | 5 | 15.3 |
|  | B30 | IMD5 | \|3*$f_{B30}$ − 2*$f_{n77}$\| | 2310 | 5 | 25 | 2355 | 5 | N/A |
|  | n77 |  |  | 3905 | 10 | 50 | 3905 | 10 |  |
|  | n5 |  |  | 835 | 5 | 25 | 880 | 5 | 4.4 |

There is IMD3 products produced by Band n5 and 30 that impact the reference sensitivity of NR n77. If the UE transmits uplink signals via uplink bands of operating bands n5 and 30, IMD products are produced and then a reference sensitivity in operating band n77 is degraded. Therefore, a value of MSD is needed to apply the reference sensitivity.

Hereinafter, MSD tables are same with the above description.

(2) DC_8_n28-n79

1) Operating Bands for DC

Table 13 shows DC band combination of LTE 1DL/1UL+ inter-band NR 2DL/1UL.

TABLE 13

| E-UTRA and NR DC Band combination | E-UTRA and NR DC Band | Uplink (UL) band BS receive/UE transmit FUL_low-FUL_high | Downlink (DL) band BS transmit/UE receive FDL_low-FDL_high | Duplex mode |
|---|---|---|---|---|
| DC_8_n28-n79 | 8 | 880 MHz-915 MHz | 925 MHz-960 MHz | FDD |
|  | n28 | 703 MHz-748 MHz | 758 MHz-803 MHz | FDD |
|  | n79 | 4400 MHz-5000 MHz | 4400 MHz-5000 MHz | TDD |

2) Channel Bandwidths Per Operating Band for DC

Table 14 shows Supported bandwidths per DC LTE 1DL/1UL+inter-band NR 2DL/1UL.

TABLE 14

DC operating/channel bandwidth

| E-UTRA and NR DC Configuration | UL Configurations | E-UTRA and NR Band | Sub-carrier Spacing [kHz] | 5 MHz | 10 MHz | 15 MHz | 20 MHz | 25 MHz | 30 MHz | 40 MHz | 50 MHz |
|---|---|---|---|---|---|---|---|---|---|---|---|
| DC_8A_n28A-n79A | DC_8A_n28A DC_8A_n79A | 8 | 15 | Yes | Yes | | | | | | |
| | | n28 | 15 | Yes | Yes | Yes | Yes | | Yes | | |
| | | | 30 | | Yes | Yes | Yes | | Yes | | |
| | | | 60 | | | | | | | | |
| | | n79 | 15 | | | | | | | Yes | Yes |
| | | | 30 | | | | | | | Yes | Yes |
| | | | 60 | | | | | | | Yes | Yes |

| E-UTRA and NR DC Configuration | UL Configurations | E-UTRA and NR Band | Sub-carrier Spacing [kHz] | 60 MHz | 70 MHz | 80 MHz | 90 MHz | 100 MHz | Maximum aggregated bandwidth For DL [MHz] |
|---|---|---|---|---|---|---|---|---|---|
| DC_8A_n28A-n79A | DC_8A_n28A DC_8A_n79A | 8 | 15 | | | | | | 140 |
| | | n28 | 15 | | | | | | |
| | | | 30 | | | | | | |
| | | | 60 | | | | | | |
| | | n79 | 15 | | | | | | |
| | | | 30 | Yes | | Yes | | Yes | |
| | | | 60 | Yes | | Yes | | Yes | |

3) Co-Existence Studies

Based on the co-existence studies of DC_8A-n28A and DC_8A-n79A, 5th order IMD generated by dual uplink of Band 8+Band n28 may also fall into own Rx of band n79 and 5th order IMD generated by dual uplink of Band 8+Band n79 may also fall into own Rx of band n28.

4) ATIB and ARIB Values

For DC_8_n28-n79, the $\Delta T_{IB,c}$ and $\Delta R_{IB,c}$ values are given in the tables below.

TABLE 15

| Inter-band DC Configuration | E-UTRA and NR Band | $\Delta T_{IB,c}$ [dB] |
|---|---|---|
| DC_8_n28-n79 | 8 | 0.6 |
| | n28 | 0.5 |
| | n79 | 0.8 |

TABLE 16

| Inter-band DC Configuration | E-UTRA and NR Band | $\Delta R_{IB}$ [dB] |
|---|---|---|
| DC_8_n28-n79 | 8 | 0.2 |
| | n28 | 0.2 |
| | n79 | 0.5 |

5) MSD

Figure 9:
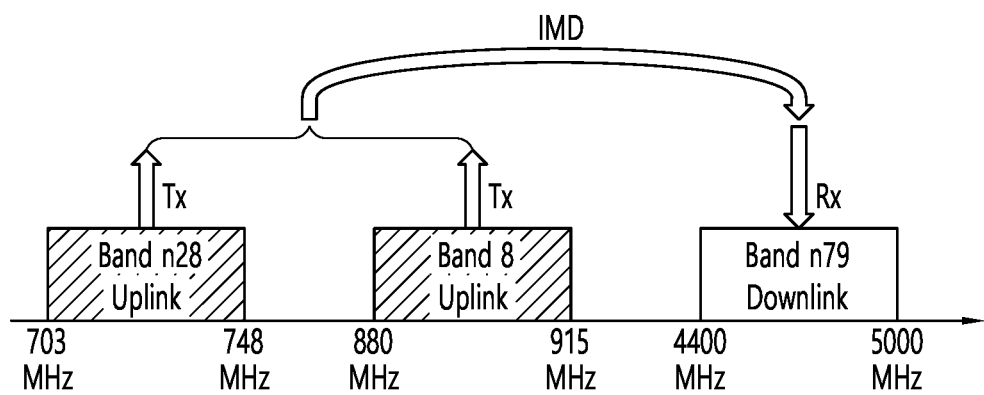
FIG. 9 and FIG. 10 illustrate exemplary IMD by a combination of band 8, n28 and n79.
Figure 10:
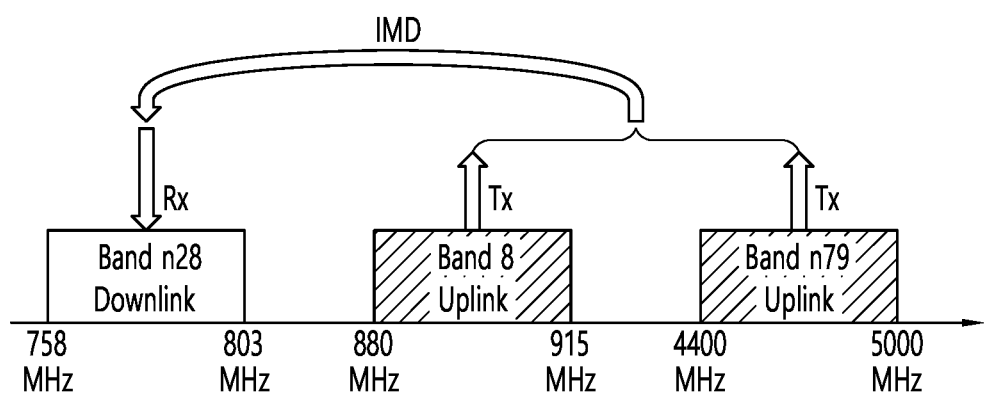

As mentioned in above, IMD5 of B8 and n28 to Band n79 Rx and IMD5 of B8 and n79 to Band n28 Rx may need to be addressed for REFSENS relaxation. The following values may be proposed:

FIG. 9 and FIG. 10 illustrate exemplary IMD by a combination of band 8, n28 and n79.

Table 17 shows reference sensitivity exceptions due to dual uplink operation for EN-DC in NR FR1 (three bands).

TABLE 17

NR or E-UTRA Band/Channel bandwidth/NRB/MSD

| EN-DC Configuration | EUTRA/ NR band | UL $F_c$ (MHz) | UL/DL BW (MHz) | UL $L_{CRB}$ | DL $F_c$ (MHz) | MSD (dB) | Duplex mode | IMD order |
|---|---|---|---|---|---|---|---|---|
| DC_8A_n28A-n79A | 8 | 912.5 | 5 | 25 | 957.5 | N/A | FDD | N/A |
| | n28 | 745.5 | 5 | 25 | 800.5 | N/A | FDD | N/A |
| | n79 | 4420 | 40 | 216 | 4420 | 0.0 | FDD | IMD5 |
| | 8 | 905 | 5 | 25 | 950 | N/A | FDD | N/A |
| | n79 | 4420 | 40 | 216 | 4420 | N/A | TDD | N/A |
| | n28 | 745 | 5 | 25 | 800 | 3.9 | FDD | IMD5 |

(3) DC_7_n12-n77

There may be IMD3 produced by Band 7 and NR band n12 that impact the reference sensitivity of NR band n77. Also IMD4 product impacted to the n77. But the MSD by IMD4 is not specified.

The required MSD level and test configuration are shown in the following Table.

TABLE 18

| NR CA inter-bands | UL DC | IMD | | UL $F_c$ (MHz) | UL BW (MHz) | UL RB # | DL $F_c$ (MHz) | DL BW (MHz) | MSD (dB) |
|---|---|---|---|---|---|---|---|---|---|
| DC_7A__n12A-n77A | B7 | IMD3 | $\|2*f_{n12} + f_{B7}\|$ | 2520 | 10 | 50 | 2640 | 10 | N/A |
| | n12 | | | 708 | 5 | 25 | 738 | 5 | |
| | n77 | | | 3936 | 10 | 50 | 3936 | 10 | 15.2 |

(4) DC_7_n71-n77

There may be IMD3 produced by Band 7 and NR band n71 that impact the reference sensitivity of NR band n77. Also IMD4 product impacted to the n77. But the MSD by IMD4 is not specified.

The required MSD level and test configuration are shown in the following Table.

TABLE 19

| NR CA inter-bands | UL DC | IMD | | UL $F_c$ (MHz) | UL BW (MHz) | UL RB # | DL $F_c$ (MHz) | DL BW (MHz) | MSD (dB) |
|---|---|---|---|---|---|---|---|---|---|
| DC_7A__n71A-n77A | B7 | IMD3 | $\|2*f_{n71} + f_{B7}\|$ | 2520 | 10 | 50 | 2640 | 10 | N/A |
| | n71 | | | 693 | 5 | 25 | 647 | 5 | |
| | n77 | | | 3906 | 10 | 50 | 3906 | 10 | 15.2 |

(5) DC_5_n2-n41

There may be IMD2 produced by Band 5 and NR band n2 that impact the reference sensitivity of NR band n41.

The required MSD levels and test configuration are shown in the following Table.

TABLE 20

| NR CA inter-bands | UL DC | IMD | | UL Fc (MHz) | UL BW (MHz) | UL RB # | DL Fc (MHz) | DL BW (MHz) | MSD (dB) |
|---|---|---|---|---|---|---|---|---|---|
| DC_5A__n2A-n41A | B5 | IMD2 | $\|f_{B5} + f_{n2}\|$ | 829 | 5 | 25 | 874 | 5 | N/A |
| | n2 | | | 1855 | 5 | 25 | 1935 | 5 | |
| | n41 | | | 2684 | 5 | 25 | 2684 | 5 | 29.7 |

(6) DC_3_n28-n75

There may be IMD5 produced by Band 3 and NR band n28 that impact the reference sensitivity of NR band n75.

The required MSD levels and test configuration are shown in the following Table.

TABLE 21

| NR CA inter-bands | UL DC | IMD | | UL Fc (MHz) | UL BW (MHz) | UL RB # | DL Fc (MHz) | DL BW (MHz) | MSD (dB) |
|---|---|---|---|---|---|---|---|---|---|
| DC_3A__n28A-n75A | B3 | IMD5 | $\|3*f_{n28} - 2*f_{B3}\|$ | 1780 | 5 | 25 | 1875 | 5 | N/A |
| | n28 | | | 708 | 5 | 25 | 763 | 5 | |
| | n75 | | | — | — | — | 1436 | 5 | 3.3 |

(7) DC_2-5_n2-n41

There may be IMD2 produced by Band 5 and NR band n2 that impact the reference sensitivity of NR band n41.

The required MSD levels and test configuration are shown in the following Table.

TABLE 22

| NR CA inter-bands | UL DC | IMD | UL $F_c$ (MHz) | UL BW (MHz) | UL RB # | DL $F_c$ (MHz) | DL BW (MHz) | MSD (dB) |
|---|---|---|---|---|---|---|---|---|
| DC_2A-5A__n2A-n41A | B5 | IMD2 | 829 | 5 | 25 | 874 | 5 | N/A |
| | n2 | $\|f_{B5} + f_{n2}\|$ | 1855 | 5 | 25 | 1935 | 5 | |
| | n41 | | 2684 | 5 | 25 | 2684 | 5 | 29.7 |

III. MSD for CA

For remaining MSD analysis for NR CA_n28A-n74A, CA_n74A-n77A, the following MSD based on the simulation assumptions may be proposed.

Table 21 shows coexistence analysis for NR CA band combinations in Rel-17

TABLE 23

| NR CA configuration | Uplink CA configuration | Harmonic issue in 3rd band | IMD problem in 3rd band |
|---|---|---|---|
| CA_n1A-n18A-n28A | CA_n1A-n28A | — | 5th IMD into n18 |
| | CA_n18A-n28A | — | 5th IMD into n1 |
| CA_n1A-n18A-n41A | CA_n1A-n41A | — | 5th IMD into n18 |
| CA_n18A-n28A-n41A | CA_n18A-n28A | — | 5th IMD into n41 |
| | CA_n18A-n41A | — | 5th IMD into n28 |
| CA_n18A-n41A-n77A | CA_n41A-n77A | — | 2nd & 3rd IMDs into n18 |
| CA_n18A-n41A-n78A | CA_n41A-n78A | — | 2nd IMD into n18 |
| CA_n1A-n18A-n77A | CA_n1A-n77A | — | 5th IMD into n18 |
| CA_n3A-n77A-n79A | CA_n77A-n79A | — | 4th & 5th IMD into n3 |

For the MSD analysis of these several NR CA combinations, the following parameters and attenuation levels based on current UE RF FE components as following tables may be assumed.

Tables 22 and 23 show the RF component isolation parameters to derive MSD level at sub-6 GHz. Tables 22 and 23 show UE RF Front-end component parameters.

TABLE 24

| | Diplexer-Duplexer or Triplexer-Duplexer Architecture w/single ant. CA_n28A-n74A, CA_n74A-n77A | | | |
|---|---|---|---|---|
| UE ref. architecture Component | IP2 (dBm) | IP3 (dBm) | IP4 (dBm) | IP5 (dBm) |
| Ant. Switch | 112 | 68 | 55 | 55 |
| Triplexer | 110 | 72 | 55 | 52 |
| Diplexer | 115 | 87 | 55 | 55 |
| Duplexer | 100 | 75 | 55 | 53 |
| Duplexer (n74) | 95 | 70 | 50 | 50 |
| PA Forward | 28.0 | 32 | 30 | 28 |
| PA Reversed | 40 | 30.5 | 30 | 30 |
| LNA | 10 | 0 | 0 | −10 |

TABLE 25

| | Triplexer-Diplexer Architecture w/single ant. or dual ant. CA_n18-n41-n77, CA_n18-n41-n78, CA_n1-n18-n77, CA_n3-n77-n79 | | | | Cascaded Diplexer Architecture w/single ant. CA_n1-n18-n28, CA_n1-n18-n41, CA_n18-n28-n41 | | | |
|---|---|---|---|---|---|---|---|---|
| UE ref. architecture Component | IP2 (dBm) | IP3 (dBm) | IP4 (dBm) | IP5 (dBm) | IP2 (dBm) | IP3 (dBm) | IP4 (dBm) | 1P5 (dBm) |
| Ant. Switch | 112 | 68 | 55 | 55 | 112 | 68 | 55 | 55 |
| Triplexer | 110 | 72 | 55 | 52 | | | | |
| Quadplexer | | | | | 112 | 72 | 55 | 52 |
| Diplexer | 115 | 87 | 55 | 55 | 115 | 87 | 55 | 55 |

TABLE 25-continued

| UE ref. architecture Component | Triplexer-Diplexer Architecture w/single ant. or dual ant. CA__n18-n41-n77, CA__n18-n41-n78, CA__n1-n18-n77, CA__n3-n77-n79 | | | | Cascaded Diplexer Architecture w/single ant. CA__n1-n18-n28, CA__n1-n18-n41, CA__n18-n28-n41 | | | |
|---|---|---|---|---|---|---|---|---|
| | IP2 (dBm) | IP3 (dBm) | IP4 (dBm) | IP5 (dBm) | IP2 (dBm) | IP3 (dBm) | IP4 (dBm) | 1P5 (dBm) |
| Duplexer | 100 | 75 | 55 | 53 | 100 | 75 | 55 | 53 |
| PA Forward | 28.0 | 32 | 30 | 28 | 28.0 | 32 | 30 | 28 |
| PA Reversed | 40 | 30.5 | 30 | 30 | 40 | 30.5 | 30 | 30 |
| LNA | 10 | 0 | 0 | −10 | 10 | 0 | 0 | −10 |

Table 24 shows the isolation levels according to the RF component. Table 21 shows UE RF Front-end component parameters.

TABLE 26

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (in) | 50 | H-H cross-band |
| LNA (in) to PA (out) | 60 | L-H/H-L cross-band |

TABLE 26-continued

| Isolation Parameter | Value (dB) | Comment |
|---|---|---|
| LNA (in) to PA (out) | 50 | H-H cross-band |
| Duplexer | 50 | Tx band rejection at Rx band |
| Duplexer (n74) | 40 | Tx band rejection at Rx band |

Based on these assumptions, the MSD levels as below in Tables 25 and 26 may be proposed.

Figure 11:
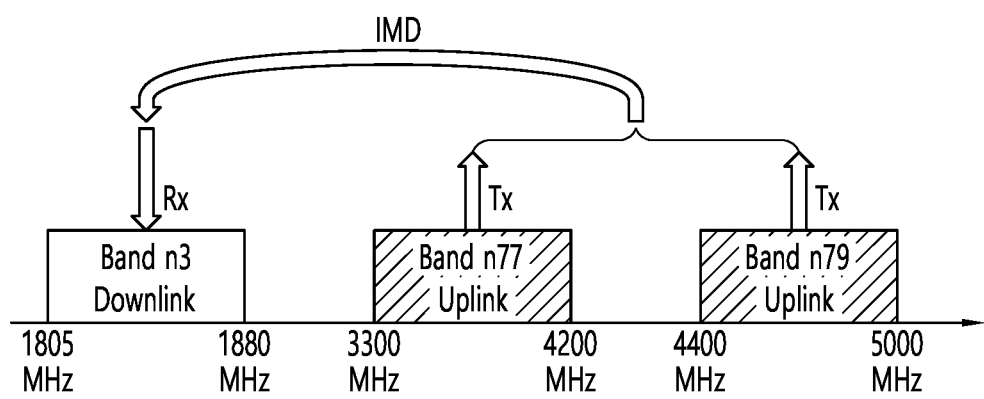
FIG. 11 illustrates exemplary IMD by a combination of band n3, n77 and n79.

FIG. 11 illustrates exemplary IMD by a combination of band n3, n77 and n79.

Tables 25 and 26 show Proposed MSD test configuration and results for self desense problems.

TABLE 27

| DC bands | UL DC | IMD | | UL $F_c$ (MHz) | UL BW (MHz) | UL RB # | DL $F_c$ (MHz) | DL BW (MHz) | MSD (dB) |
|---|---|---|---|---|---|---|---|---|---|
| CA_n28A-n74A | n28 | IMD2 | $\|f_{n28} - f_{n74}\|$ | 706 | 5 | 25 | 761 | 5 | 32.7 |
| | n74 | | | 1467 | 5 | 25 | 1515 | 5 | N/A |
| | n28 | IMD4 | $\|2*f_{n28} - 2*f_{n74}\|$ | 708.5 | 5 | 25 | 763.5 | 5 | N/A |
| | n74 | | | 1465 | 5 | 25 | 1513 | 5 | 11.4 |
| CA_n74A-n77A | n74 | IMD5 | $\|3*f_{n28} - 2*f_{n74}\|$ | 708.5 | 5 | 25 | 763.5 | 5 | 6.6 |
| | n77 | | | 1444.5 | 5 | 25 | 1492.5 | 5 | N/A |

TABLE 28

| NR CA inter-bands | UL DC | IMD | | UL $F_c$ (MHz) | UL BW (MHz) | UL RB # | DL $F_c$ (MHz) | DL BW (MHz) | MSD (dB) |
|---|---|---|---|---|---|---|---|---|---|
| CA_n1A-n18A-n28A | n1 | IMD5 | $\|f_{n1} - 4*f_{n28}\|$ | 1965 | 5 | 25 | 2155 | 5 | N/A |
| | n28 | | | 708 | 5 | 25 | 763 | 5 | |
| | n18 | | | 822 | 5 | 25 | 867 | 5 | 4.6 |
| | n18 | IMD5 | $\|f_{n18} - 4*f_{n28}\|$ | 825 | 5 | 25 | 870 | 5 | N/A |
| | n28 | | | 738 | 5 | 25 | 793 | 5 | |
| | n1 | | | 1937 | 5 | 25 | 2127 | 5 | 4.0 |
| CA_n1A_n18A-n41A | n1 | IMD5 | $\|3*f_{n1} - 2*f_{n41}\|$ | 1960 | 5 | 25 | 2150 | 5 | N/A |
| | n41 | | | 2505 | 10 | 50 | 2505 | 10 | |
| | n18 | | | 825 | 5 | 25 | 870 | 5 | 3.3 |
| CA_n18A-n28A-n41A | n18 | IMD5 | $\|4*f_{n18} - f_{n28}\|$ | 825 | 5 | 25 | 870 | 5 | N/A |
| | n28 | | | 738 | 5 | 25 | 793 | 5 | |
| | n41 | | | 2562 | 10 | 50 | 2562 | 10 | 4.4 |
| | n18 | IMD5 | $\|4*f_{n18} - f_{n41}\|$ | 825 | 5 | 25 | 870 | 5 | N/A |
| | n41 | | | 2505 | 10 | 50 | 2505 | 10 | |
| | n28 | | | 740 | 5 | 25 | 795 | 5 | 3.9 |
| CA_n18A_n41A-n77A | n41 | IMD2 | $\|f_{n41} - f_{n77}\|$ | 2590 | 10 | 50 | 2590 | 10 | N/A |
| | n77 | | | 3460 | 10 | 50 | 3460 | 10 | |
| | n18 | | | 825 | 5 | 25 | 870 | 5 | 29.3 |
| CA_n18A_n41A-n78A | n41 | IMD2 | $\|f_{n41} - f_{n78}\|$ | 2590 | 10 | 50 | 2590 | 10 | N/A |
| | n78 | | | 3460 | 10 | 50 | 3460 | 10 | |
| | n18 | | | 825 | 5 | 25 | 870 | 5 | 29.3 |

TABLE 28-continued

| NR CA inter-bands | UL DC | IMD | UL F$_c$ (MHz) | UL BW (MHz) | UL RB # | DL F$_c$ (MHz) | DL BW (MHz) | MSD (dB) |
|---|---|---|---|---|---|---|---|---|
| CA_n1A_n18A-n77A | n1 | IMD5 | $\|3*f_{n1} - 2*f_{n77}\|$ | 1970 | 5 | 25 | 2160 | 5 | N/A |
| | n77 | | | 3390 | 10 | 50 | 3390 | 10 | |
| | n18 | | | 825 | 5 | 25 | 870 | 5 | 3.5 |
| CA_n3A_n77A-n79A | n77 | IMD4 | $\|2*f_{n77} - f_{n79}\|$ | 3350 | 10 | 50 | 3350 | 10 | N/A |
| | n79 | | | 4840 | 40 | 216 | 4840 | 40 | |
| | n3 | | | 1765 | 5 | 25 | 1860 | 5 | 15.7 |

Another NR DC band combos for DC_8A-41A_n77A or DC_8A-41C_n77A, the proposed MSD and test configuration may be proposed as follow

TABLE 29

NR or E-UTRA Band/Channel bandwidth/NRB/MSD

| EN-DC Configuration | EUTRA/ NR band | UL F$_c$ (MHz) | UL/DL BW (MHz) | UL L$_{CRB}$ | DL F$_c$ (MHz) | MSD (dB) | Duplex mode | IMD order |
|---|---|---|---|---|---|---|---|---|
| DC 8A-41A_n77A | 41 | 2630 | 10 | 50 | 2630 | N/A | TDD | N/A |
| DC_8A-41C_n77A | n77 | 3580 | 10 | 50 | 3580 | N/A | TDD | N/A |
| | 8 | 905 | 5 | 25 | 950 | 29.1 | FDD | IMD2[1,4] |

NOTE[1]:
This band is subject to IMD3 also which MSD is not specified.
NOTE[4]:
This band is subject to IMD5 also which MSD is not specified.

±α tolerance may be applied to the MSD values shown in the tables 11-12, 17-22, 27-29. For example, a is 0, 0.1, 0.2, 0.3, 0.4, 0.5, 0.6, 0.7, . . . may be 2.0. That is, the range of MSD values proposed in the present specification may include MSD values to which a tolerance of ±α is applied.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
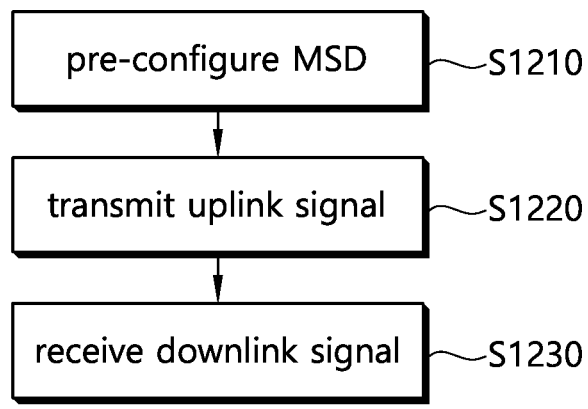
FIG. 12 is a flow chart showing an example of a procedure of a terminal according to the present disclosure.

FIG. 12 is a flow chart showing an example of a procedure of a terminal according to the present disclosure.

Referring to FIG. 12, steps S1210 to S1230 are shown. Operations described below may be performed by the terminal.

For reference, step S1210 may not always be performed when the terminal performs communication. For example, step S1210 may be performed only when the reception performance of the terminal is tested.

In step S1210, the terminal may preset the above proposed MSD value. For example, the terminal may preset the MSD values in Table 11. For example, for the combination of the DC_8A-n28A-n79A downlink band and the DC_8A-n79A uplink band, an MSD of 3.9 dB may be applied to the reference sensitivity of the downlink band n28.

In step S1220, the terminal may transmit the uplink signal.

When the combination of the DC_8A-n28A-n79A downlink band and the DC_8A-n9A uplink band is configured in the terminal, the terminal may transmit the uplink signal through the uplink operating bands 8 and n79.

In step S1230, the terminal may receive the downlink signal.

The terminal may receive the downlink signal based on the reference sensitivity of the downlink band n28, to which the MSD value is applied.

When the combination of the DC_8A-n28A-n79A downlink band and the DC_8A-n79A uplink band is configured in the terminal, the terminal may receive the downlink signal through the downlink operating band n28.

For reference, the order in which steps S1220 and S1230 are performed may be different from that shown in FIG. 24. For example, step S1230 may be performed first and then step S1220 may be performed. Alternatively, step S1220 and step S1230 may be performed simultaneously. Alternatively, the time when step S1220 and step S1230 may be may overlap partially.

Hereinafter, an apparatus in mobile communication, according to some embodiments of the present disclosure, will be described.

For example, a base station may include a processor, a transceiver, and a memory.

For example, the processor may be configured to be coupled operably with the memory and the processor.

The processor may be configured to transmitting an uplink signal via at least two bands among three bands; and receiving a downlink signal, wherein the at least two bands are configured for an Evolved Universal Terrestrial Radio Access (E-UTRA)-New Radio (NR) Dual Connectivity (EN-DC), wherein a value of Maximum Sensitivity Degradation (MSD) is applied to a reference sensitivity for receiving the downlink signal, wherein the value of the MSD is pre-configured for a first combination of bands 30, n5 and n77, a second combination of band 8, n28 and n79, a third combination of bands 7, n12 and n77, a fourth combination of bands 7, n71 and n77, a fifth combination of bands 5, n2 and n41, a sixth combination of bands 3, n28 and n75.

Hereinafter, a processor in mobile communication, according to some embodiments of the present disclosure, will be described.

The processor may be configured to transmitting an uplink signal via at least two bands among three bands; and receiving a downlink signal, wherein the at least two bands are configured for an Evolved Universal Terrestrial Radio Access (E-UTRA)-New Radio (NR) Dual Connectivity (EN-DC), wherein a value of Maximum Sensitivity Degradation (MSD) is applied to a reference sensitivity for receiving the downlink signal, wherein the value of the MSD is pre-configured for a first combination of bands 30, n5 and n77, a second combination of band 8, n28 and n79, a third combination of bands 7, n12 and n77, a fourth combination of bands 7, n71 and n77, a fifth combination of bands 5, n2 and n41, a sixth combination of bands 3, n28 and n75.

Hereinafter, a non-transitory computer-readable medium has stored thereon a plurality of instructions for . . . in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the base station to

The present disclosure can have various advantageous effects.

For example, by performing disclosure of this specification, UE can transmit signal with dual uplink by applying MSD value.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A device configured to operate in a wireless system, the device comprising:
a transceiver configured with an Evolved Universal Terrestrial Radio Access (E-UTRA)—New Radio (NR) Dual Connectivity (EN-DC),
wherein the EN-DC is configured to use three bands,
a processor operably connectable to the transceiver,
wherein the processer is configured to:
control the transceiver to receive a downlink signal,
control the transceiver to transmit an uplink signal via at least two bands among the three bands,
wherein a value of Maximum Sensitivity Degradation (MSD) is applied to a reference sensitivity for receiving the downlink signal,
wherein the value of the MSD is pre-configured for a first combination of bands 30, n5 and n77, a second combination of band 8, n28 and n79, a third combination of bands 7, n12 and n77, a fourth combination of bands 7, n71 and n77, a fifth combination of bands 5, n2 and n41, a sixth combination of bands 3, n28 and n75,
wherein the value of the MSD is 3.9 dB for band n28 based on the second combination of band 8, n28 and n79.

2. The device of claim 1,
wherein the value of the MSD is 16.1 dB for band n77 based on the first combination of bands 30, n5 and n77.

3. The device of claim 1,
wherein the value of the MSD is 15.3 dB for band n5 based on the first combination of bands 30, n5 and n77.

4. The device of claim 1,
wherein the value of the MSD is 4.4 dB for band n5 based on the first combination of bands 30, n5 and n77.

5. The device of claim 1,
wherein the value of the MSD is 0.0 dB for band n79 based on the second combination of band 8, n28 and n79.

6. The device of claim 1,
wherein the value of the MSD is 15.2 dB for band n77 based on the third combination of bands 7, n12 and n77.

7. The device of claim 1,
wherein the value of the MSD is 15.2 dB for band n77 based on the fourth combination of bands 7, n71 and n77.

8. The device of claim 1,
wherein the value of the MSD is 29.7 dB for band n41 based on the fifth combination of bands 5, n2 and n41.

9. The device of claim 1,
wherein the value of the MSD is 3.3 dB for band n75 based on the sixth combination of bands 3, n28 and n75.

10. The device of claim 1,
wherein for the first combination of bands 30, n5 and n77, the band 30 is used for the E-UTRA and the bands n5 and n77 are used for the NR,
wherein for the second combination of band 8, n28 and n79, the band 8 is used for the E-UTRA and the bands n28 and n79 are used for the NR,
wherein for the third combination of bands 7, n12 and n77, the band 7 is used for the E-UTRA and the bands n12 and n77 are used for the NR,
wherein for the fourth combination of bands 7, n71 and n77, the band 7 is used for the E-UTRA and the bands n71 and n77 are used for the NR,
wherein for the fifth combination of bands 5, n2 and n41, the band 5 is used for the E-UTRA and the bands n2 and n41 are used for the NR,
wherein for the sixth combination of bands 3, n28 and n75, band 3 is used for the E-UTRA and the bands n28 and n75 are used for the NR.

11. A device configured to operate in a wireless system, the device comprising:
a transceiver configured with New Radio (NR) operating bands for CA (Carrier Aggregation),
wherein the NR operating bands are configured to three bands
a processor operably connectable to the transceiver,
wherein the processer is configured to:
control the transceiver to receive a downlink signal,
control the transceiver to transmit an uplink signal via at least two bands among the three bands,
wherein a value of Maximum Sensitivity Degradation (MSD) is applied to a reference sensitivity for receiving the downlink signal,
wherein the value of the MSD is pre-configured for a first combination of bands n1, n18 and n28, a second combination of band n1, n18 and n41, a third combination of bands n18, n28 and n41, a fourth combination of bands n18, n41 and n77, a fifth combination of bands n18, n41 and n78, a sixth combination of bands n1, n18 and n77, a seventh combination of bands n3, n77 and n79,
wherein the value of the MSD is 4.6 dB for band n18 based on the first combination of bands n1, n18 and n28,
wherein the value of the MSD is 4.0 dB for band n1 based on the first combination of bands n1, n18 and n28,
wherein the value of the MSD is 3.3 dB for band n18 based on the second combination of band n1, n18 and n41,
wherein the value of the MSD is 4.4 dB for band n41 based on the third combination of bands n18, n28 and n41,
wherein the value of the MSD is 3.9 dB for band n28 based on the third combination of bands n18, n28 and n41,
wherein the value of the MSD is 29.3 dB for band n18 based on the fourth combination of bands n18, n41 and n77,
wherein the value of the MSD is 29.3 dB for band n18 based on the fifth combination of bands n18, n41 and n78,
wherein the value of the MSD is 3.5 dB for band n18 based on the sixth combination of bands n1, n18 and n77,
wherein the value of the MSD is 15.7 dB for band n3 based on the seventh combination of bands n3, n77 and n79.

12. A method performed by a device comprising:
transmitting an uplink signal via at least two bands among three bands; and
receiving a downlink signal,
wherein the at least two bands are configured for an Evolved Universal Terrestrial Radio Access (E-UTRA)—New Radio (NR) Dual Connectivity (EN-DC),
wherein a value of Maximum Sensitivity Degradation (MSD) is applied to a reference sensitivity for receiving the downlink signal,
wherein the value of the MSD is pre-configured for a first combination of bands 30, n5 and n77, a second combination of band 8, n28 and n79, a third combination of bands 7, n12 and n77, a fourth combination of bands 7, n71 and n77, a fifth combination of bands 5, n2 and n41, a sixth combination of bands 3, n28 and n75,
wherein the value of the MSD is 3.9 dB for band n28 based on the second combination of band 8, n28 and n79.

* * * * *